(12) United States Patent  
Koshimae

(10) Patent No.: US 11,573,984 B2
(45) Date of Patent: *Feb. 7, 2023

(54) INFORMATION PROCESSING DEVICE, INFORMATION PROCESSING METHOD, AND PROGRAM

(71) Applicant: Sony Group Corporation, Tokyo (JP)

(72) Inventor: Hidenari Koshimae, Tokyo (JP)

(73) Assignee: Sony Group Corporation ( * ) Notice: Subject to any disclaimer, the term of this patent is extended or adjusted under 35 U.S.C. 154(b) by 170 days.

This patent is subject to a terminal disclaimer.

(21) Appl. No.: 17/027,102

(22) Filed: Sep. 21, 2020

(65) Prior Publication Data
US 2021/0004392 A1 Jan. 7, 2021

Related U.S. Application Data

(63) Continuation of application No. 15/880,847, filed on Jan. 26, 2018, now Pat. No. 10,817,541, which is a (Continued)

(30) Foreign Application Priority Data

Jun. 17, 2011 (JP) .................. 2011-135229

(51) Int. Cl.
G06F 16/20 (2019.01)
G06F 16/28 (2019.01)
(Continued)

(52) U.S. Cl.
CPC .......... *G06F 16/285* (2019.01); *G06F 3/0488* (2013.01); *G06F 3/04847* (2013.01);
(Continued)

(58) Field of Classification Search
None
See application file for complete search history.

(56) References Cited

U.S. PATENT DOCUMENTS 7,693,870 B2 4/2010 Gotoh et al.
8,064,633 B2 * 11/2011 Noda .................. G06F 16/58
348/383

(Continued)

FOREIGN PATENT DOCUMENTS

CN 1975735 A 6/2007
CN 101256679 A 9/2008
(Continued)

OTHER PUBLICATIONS

Kondo, et al., Reverse Lookup Reference 108 for iOS Programming, Japan, Mainichi Communications, Inc., First edition, pp. 168-169, 2010.

(Continued)

*Primary Examiner* — Belix M Ortiz Ditren
(74) *Attorney, Agent, or Firm* — Lerner, David, Littenberg, Krumholz & Mentlik, LLP

(57) ABSTRACT

There is provided an information processing device including a display control unit configured to display pieces of content at a first position of a screen, a condition setting unit configured to set a clustering condition for the pieces of content in accordance with a user operation, and a clustering unit configured to classify the pieces of content into a cluster in accordance with the clustering condition. The display control unit moves a display of the pieces of content from the first position toward a second position corresponding to the cluster.

20 Claims, 13 Drawing Sheets

Related U.S. Application Data continuation of application No. 14/974,041, filed on Dec. 18, 2015, now Pat. No. 9,922,112, which is a continuation of application No. 13/490,551, filed on Jun. 7, 2012, now Pat. No. 9,275,057.

(51) Int. Cl.
| | |
|---|---|
| *G06F 16/51* | (2019.01) |
| *G06F 16/44* | (2019.01) |
| *G06F 16/532* | (2019.01) |
| *G06F 3/04847* | (2022.01) |
| *G06F 3/0488* | (2022.01) |

(52) U.S. Cl.
CPC ............ *G06F 16/447* (2019.01); *G06F 16/51* (2019.01); *G06F 16/532* (2019.01); *G06F 2203/04808* (2013.01)

(56) References Cited

U.S. PATENT DOCUMENTS

| | | | |
|---|---|---|---|
| 8,189,928 | B2 | 5/2012 | Gotoh et al. |
| 2006/0161867 | A1 | 7/2006 | Drucker et al. |
| 2007/0136286 | A1 | 6/2007 | Webster et al. |
| 2011/0126148 | A1 | 5/2011 | Krishnaraj et al. |
| 2012/0290984 | A1* | 11/2012 | Gong .................... G06F 3/0482 715/841 |

FOREIGN PATENT DOCUMENTS

| | | |
|---|---|---|
| JP | 2003216927 A | 7/2003 |
| JP | 2004328265 A | 11/2004 |
| JP | 2006502458 A | 1/2006 |
| JP | 2006065368 A | 3/2006 |
| JP | 2007094762 A | 4/2007 |
| JP | 2007226555 A | 9/2007 |
| JP | 2007266902 A | 10/2007 |
| JP | 2007310890 A | 11/2007 |
| JP | 2008250605 A | 10/2008 |
| JP | 2009176114 A | 8/2009 |
| JP | 2010117842 A | 5/2010 |
| JP | 2010271774 A | 12/2010 |
| JP | 2011008556 A | 1/2011 |

OTHER PUBLICATIONS

Japanese Office Action for Application No. 2011135229, dated Nov. 4, 2014.
Japanese Office Action for Application No. 2015-094979 dated Apr. 26, 2016.
Chinese Office Action for Application No. 201210206340.0 dated Jun. 15, 2016.
Chinese Office Action for CN Application No. 2017102283600, dated Apr. 19, 2018.
Japanese Office Action for Application No. 2018128079, dated Sep. 17, 2019.
IPad 2+iOS 4.3 Start Guide , Daily Communication of Co., Ltd., Jan. 1, 2011, Special appendix to Mac Fan 2011, Ltd. 05.

* cited by examiner

INFORMATION PROCESSING DEVICE, INFORMATION PROCESSING METHOD, AND PROGRAM

CROSS-REFERENCE TO RELATED APPLICATIONS

The present application is a continuation of U.S. patent application Ser. No. 15/880,847, filed on Jan. 26, 2018, which is a continuation of U.S. patent application Ser. No. 14/974,041, filed on Dec. 18, 2015, now issued as U.S. Pat. No. 9,922,112, on Mar. 20, 2018, which is a continuation of U.S. application Ser. No. 13/490,551, filed on Jun. 7, 2012, now issued as U.S. Pat. No. 9,275,057, on Mar. 1, 2016, which claims priority from Japanese Patent Application No. JP 2011-135229 filed in the Japanese Patent Office on Jun. 17, 2011, the disclosures of which are hereby incorporated herein by reference.

BACKGROUND

The present disclosure relates to an information processing device, an information processing method, and a program.

It is widely known that content clustering is performed by, for example, grouping photographs whose imaging positions or imaging date/time are close. With an increase in the capacity of storage devices, the amount of content that users hold has significantly increased. In order to easily search for or browse a large amount of content, a technique of automating content clustering is developed.

For example, JP 2008-250605A discloses a technique of automatically clustering image content based on the imaging position, and further grouping the created clusters based on the imaging date/time. Meanwhile, JP2007-094762A performs a technique of automatically clustering image content based on the imaging date/time.

SUMMARY

However, a user interface (UI) for automatic clustering according to the aforementioned technology has a lot of room to be improved in terms of interaction with a user such as, for example, allowing the user to recognize the fact that clustering is being performed, or changing a parameter of the clustering based on a user operation.

In light of the foregoing, it is desirable to provide an information processing device, an information processing method, and a program that are novel and improved and that allow a user to operate a cluster more intuitively.

According to an embodiment of the present disclosure, there is provided an information processing device including a display control unit configured to display pieces of content at a first position of a screen, a condition setting unit configured to set a clustering condition for the pieces of content in accordance with a user operation, and a clustering unit configured to classify the pieces of content into a cluster in accordance with the clustering condition. The display control unit moves a display of the pieces of content from the first position toward a second position corresponding to the cluster.

According to another embodiment of the present disclosure, there is provided an information processing method including displaying pieces of content at a first position of a screen, setting a clustering condition for the pieces of content in accordance with a user operation, classifying the pieces of content into a cluster in accordance with the clustering condition, and moving a display of the pieces of content from the first position toward a second position corresponding to the cluster.

According to still another embodiment of the present disclosure, there is provided a program for causing a computer to implement (a) a function of displaying pieces of content at a first position of a screen, (b) a function of setting a clustering condition for the pieces of content in accordance with a user operation, (c) a function of classifying the pieces of content into a cluster in accordance with the clustering condition, and (d) a function of moving a display of the pieces of content from the first position toward a second position corresponding to the cluster.

According to the embodiments of the present disclosure described above, a result of clustering is displayed through a movement of pieces of content. Thus, a user can easily grasp the result of clustering. By operating the cluster while viewing such display, it is possible to easily operate the cluster more intuitively, for example.

As described above, according to the embodiments of the present disclosure, a user can operate a cluster more intuitively.

DETAILED DESCRIPTION OF THE EMBODIMENTS

Figure 1:
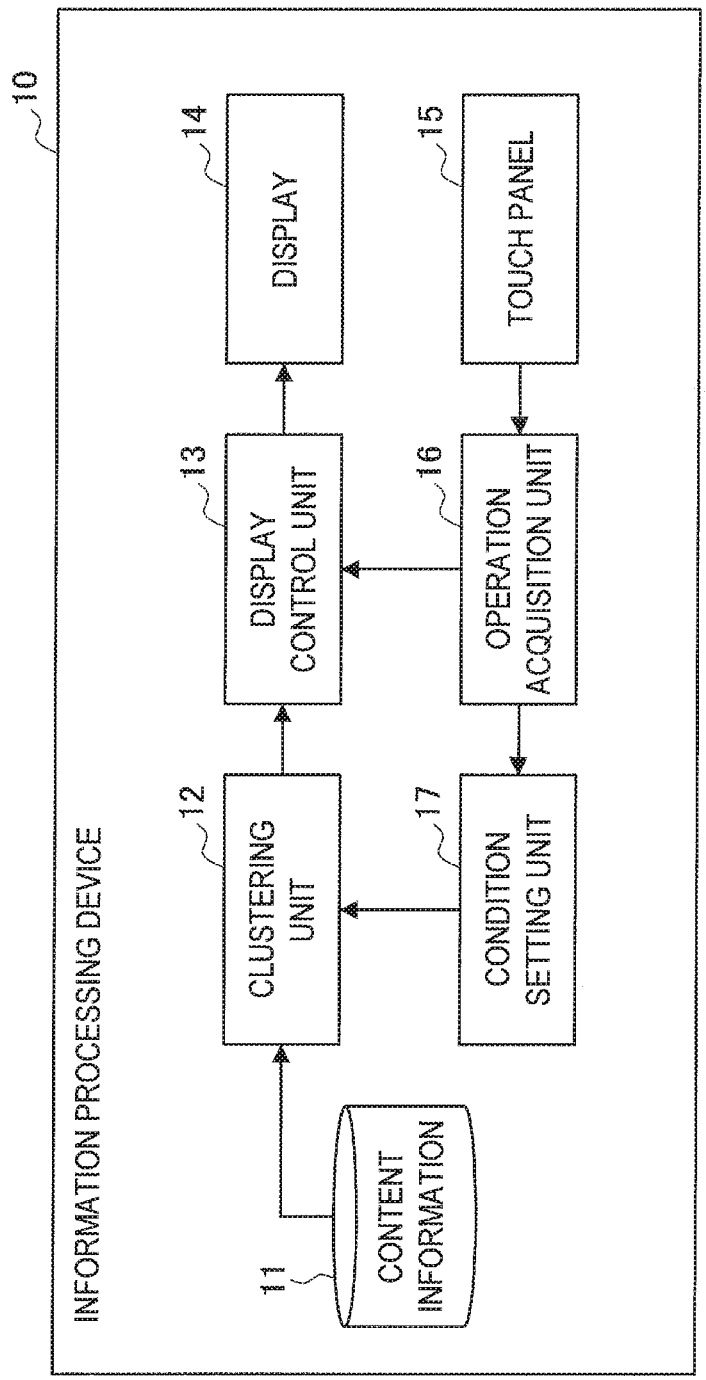
FIG. 1 is a block diagram showing the functional configuration of an information processing device in accordance with a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

1. First Embodiment (Example of Classification based on Imaging Date/Time)
2. Second Embodiment (Example of Classification based on Imaging Position)
3. Third Embodiment (Example in which Attributes Used for Classification are Changed)
4. Fourth Embodiment (Example in which Scroll Operation is Switched)
5. Fifth Embodiment (Example in which Clustering is Switched based on Two Types of Attributes)
6. Supplement

1. First Embodiment

First, a first embodiment of the present disclosure will be described with reference to FIGS. 1 to 4.

FIG. 1 is a block diagram showing the functional configuration of an information processing device 10 in accordance with the first embodiment of the present disclosure. The information processing device 10 is, for example, a device such as a portable phone or a PC (Personal Computer), and includes a clustering unit 12, a display control unit 13, a display 14, a touch panel 15, an operation acquisition unit 16, and a condition setting unit 17.

The clustering unit 12 clusters pieces of content. The function of the clustering unit 12 can be implemented using a CPU (Central Processing Unit), for example. Each content can be, for example, content such as an image or music. Information on the content is stored as content information 11 in a storage device or the like. Herein, each content has at least one attribute. For example, image content has attributes such as "imaging date/time" and "imaging place." Meanwhile, for example, music content has attributes such as "album," "artist," and "genre." The clustering unit 12 classifies pieces of content into clusters in accordance with a clustering condition related to at least a part of such content attributes. The clustering unit 12 provides information on the clusters obtained by classifying the pieces of content to the display control unit 13.

The display control unit 13 causes the display 14, which is a display device, to display a screen including content. The function of the display control unit 13 can be implemented using a CPU, for example. The display 14 may be either integrated with or separate from the information processing device 10 as in this embodiment. When the display 14 is separate from the information processing device 10, the display control unit 13 causes the display 14 to display an image via an interface such as a connection port. The display control unit 13 moves the content display position on the screen in accordance with the result of content clustering provided by the clustering unit 12. In addition, the display control unit 13 may acquire information on a user operation from the operation acquisition unit 16 and change the display in accordance with the operation. Note that an image displayed on the display 14 by the display control unit 13 is described below.

The touch panel 15 detects a touch on the display 14 as a user operation, and provides it as an operation signal to the operation acquisition unit 16. The touch panel 15 may be integrated with the information processing device 10 as in this embodiment or separate from the information processing device 10. When the touch panel 15 and the information processing device 10 are separate, the touch panel 15 provides an operation signal to the operation acquisition unit 16 via an interface such as a connection port.

The operation acquisition unit 16 acquires an operation signal provided from the touch panel 15 as a user operation input. The function of the operation acquisition unit 16 can be implemented using a CPU, for example. The operation acquisition unit 16 acquires, from the touch detected by the touch panel 15, the number of contact positions and a movement of each contact position, for example. Accordingly, for example, a user operation on the display 14 such as a touch, tap, drag, flick, or pinch, for example, can be acquired. The operation acquisition unit 16 provides information on the acquired operation to the condition setting unit 17. The operation acquisition unit 16 may further provide information on the acquired operation to the display control unit 13.

The condition setting unit 17 changes a clustering condition for the clustering unit 12 to classify pieces of content in accordance with a user operation provided from the operation acquisition unit 16. The function of the condition setting unit 17 can be implemented using a CPU, for example. Setting of a clustering condition by the condition setting unit 17 may be setting for changing the content attribute used for the clustering condition. Alternatively, the condition setting unit 17 may newly set a clustering condition that has not been set so far. Note that the setting of the clustering condition by the condition setting unit 17 is described below.

Operation Example

In this embodiment, the clustering unit 12 classifies pieces of image content. First, in accordance with a pinch operation acquired by the operation acquisition unit 16, the condition setting unit 17 newly sets a clustering condition "date" related to the attribute "imaging date/time" of the image content. Then, the clustering unit 12 classifies pieces of image content into clusters based on the clustering condition "date." Further, in accordance with a pinch operation acquired by the operation acquisition unit 16, the condition setting unit 17 changes the clustering condition to another clustering condition related to the same attribute "imaging date/time" of the image content.

Herein, the attribute "imaging date/time" in this embodiment, namely, information on the time can be said to be positional information on the time axis. In the clustering that is based on the clustering condition "date," the time axis is split per predetermined length (one day), and pieces of content that include positional information (time) in each of the split sections are classified into the same cluster. Thus, based on the clustering condition "date," pieces of content are classified into clusters (e.g., "June 2nd," "June 8th," and "July 1st") corresponding to the date to which the imaging date/time belongs. In this embodiment, the length for splitting the time axis is changed to change the granularity of the clustering.

Setting of New Clustering Condition

Figure 2:
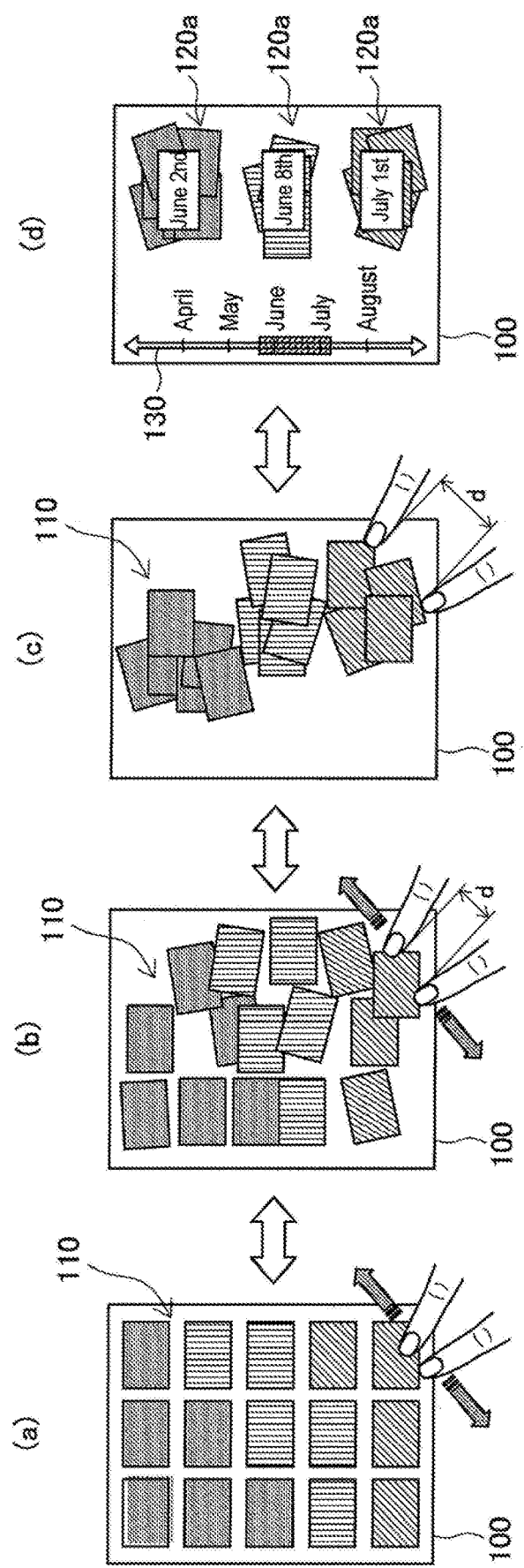
FIG. 2 is a diagram showing an example in which a clustering condition is newly set in accordance with the first embodiment of the present disclosure.

FIG. 2 is a diagram showing an example in which a clustering condition is newly set in accordance with the first embodiment of the present disclosure. In the example shown in FIG. 2, pieces of content 110 move from the positions in an unclassified state to the positions of clusters 120a obtained by classifying the pieces of content 110, on a screen 100 displayed on the display 14. In FIG. 2, such a movement process is shown by (a) to (d).

In the state of (a), the clustering unit 12 does not have a clustering condition set thereon. Therefore, the pieces of content 110 are displayed on the screen 100 as they are without being clustered. The pieces of content 110 can be displayed on the screen 100 as icons obtained by shrinking images, for example. Herein, a user starts a pinch operation on the display 14. As shown in FIG. 2, this pinch operation is a pinch-out operation on the lower right portion of the screen 100.

In this embodiment, among the clustering conditions related to the attribute "imaging date/time," a clustering condition with the finest granularity is the "date." The condition setting unit 17 that has acquired information on the pinch-out operation of the user via the touch panel 15 and the operation acquisition unit 16 changes, in accordance with the operation, the clustering condition from an unset state to a state in which the clustering condition "date" with the finest granularity is set. Accordingly, the clustering unit 12 classifies the pieces of content 110 into the clusters 120a.

The pieces of content 110 displayed on the screen 100 move from (a) to (b) and from (b) to (c) in accordance with a pinch-out operation. For such a display, the display control unit 13 acquires information on the opening amount d of the pinch-out operation from the operation acquisition unit 16, and moves the pieces of content 110 from the position in (a) to the position of each cluster 120a in (d) in proportion to the opening amount d. Such movement can also be said to be a movement from the first position at which the pieces of content 110, which are not clustered, are displayed to the second position corresponding to each cluster 120a.

Herein, it is assumed that the pinch-out operation terminates in the state of (c). The condition setting unit 17 acquires from the operation acquisition unit 16 information on the opening amount d at the termination of the pinch-out operation. The condition setting unit 17 compares the opening amount d with a predetermined threshold, and determines, if the opening amount d is greater than or equal to the threshold, setting of the clustering condition "date." At this time, the clustering unit 12 holds a state in which the pieces of content 110 are classified into the clusters 120a based on the clustering condition "date." In response, the display control unit 13 changes the display of the screen 100 to the state of (d).

Meanwhile, when the pinch-out operation terminates in the state of (c) and the opening amount d at the termination of the pinch-out operation is less than the threshold, the condition setting unit 17 cancels the setting of the clustering condition "date." That is, the condition setting unit 17 restores the clustering condition back to the unset state. At this time, the clustering unit 12 discards the state in which the pieces of content 110 are classified into the clusters 120a based on the clustering condition "date." In response, the display control unit 13 restores the display of the screen 100 back to the state of (a).

In the state of (d), the clusters 120a obtained by classifying the pieces of content 110 are displayed on the screen 100, and further, a position bar 130 is displayed. The clusters 120a indicate the clusters obtained by classifying the pieces of content 110, and can be displayed with names such as "June 2nd," "June 8th," and "July 1st." The position bar 130 is a display indicting the range of the displayed clusters 120 on the time axis. In the example shown, the position bar 130 is displayed in units of months. The position bar 130 need not correspond to the entire time series in which the pieces of content are distributed and may simply indicate a sense of scale of the clusters 120a.

As described above, in this embodiment, a clustering condition is newly set through a pinch-out operation of a user. Although a case in which a clustering condition is newly set through a pinch-out operation has been described above, it is also possible to set the clustering condition to an unset state through a pinch-in operation in a similar way.

Change of Clustering Condition

Figure 3:
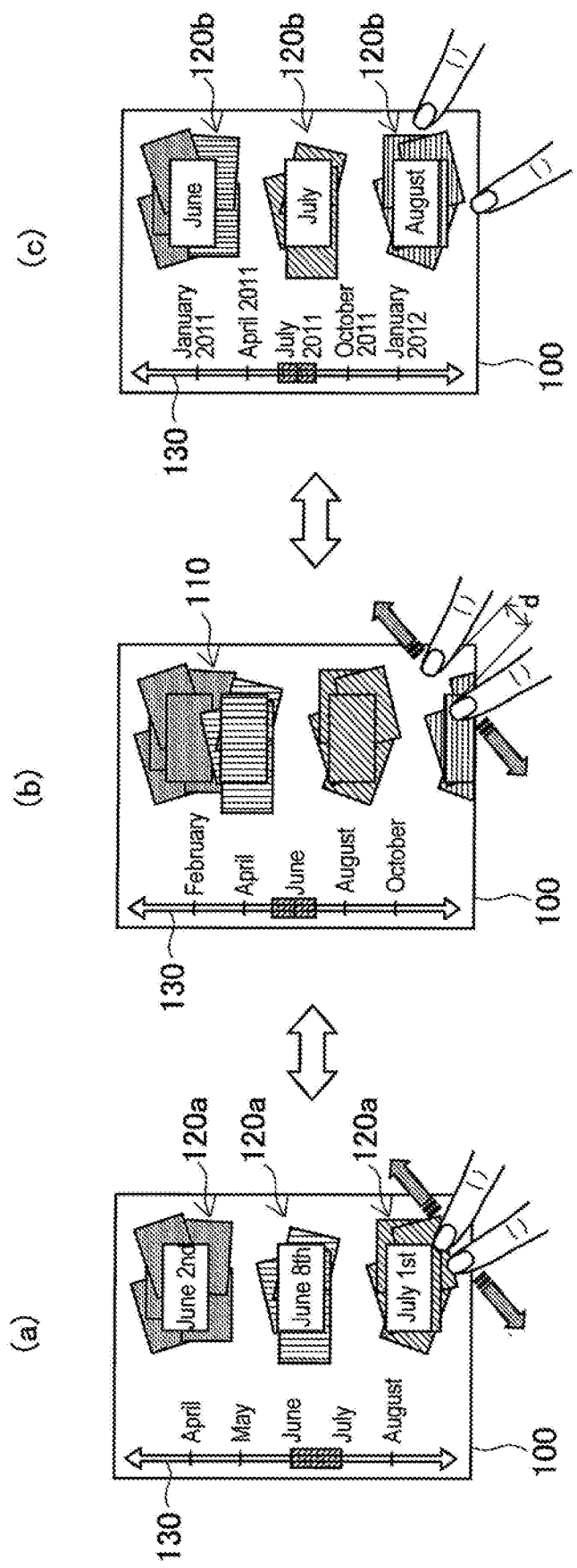
FIG. 3 is a diagram showing an example in which a clustering condition is changed in accordance with the first embodiment of the present disclosure.

FIG. 3 is a diagram showing an example in which the clustering condition is changed in accordance with the first embodiment of the present disclosure. In the example shown, the clustering condition is changed from "date" to "month." At this time, on the screen 100, the pieces of content 110 move from the positions of the clusters 120a obtained by classifying the pieces of content 110 based on the clustering condition "date" to the positions of the clusters 120b obtained by classifying the pieces of content 110 based on the clustering condition "month." In FIG. 3, such a movement process is shown by (a) to (c).

Herein, the clustering conditions "date" and "month" are adapted to split the time axis per predetermined length (one day or one month) using the same content attribute "imaging date/time" and classify pieces of content that include the positional information (time) in each of the split sections into clusters. The predetermined length herein can be said to be the granularity of clustering that uses the attribute "imaging date/time." That is, the clustering condition "date" and the clustering condition "month" are adapted to classify pieces of content into clusters by classifying the positional information of the content based on the first granularity on the time axis, and it can be said that the first granularity differs between the clustering condition "date" and the clustering condition "month."

In the state of (a), the clustering unit 12 has the clustering condition "date" set thereon. On the screen 100, the clusters 120a and the position bar 130 are displayed. Such a display is similar to that in the state of (d) in FIG. 2. Herein, the user starts a pinch-out operation on the lower right portion of the screen 100.

In this embodiment, among the clustering conditions related to the attribute "imaging date/time," a clustering condition whose granularity is one level coarser than that of the "date" is "month." Thus, the condition setting unit 17 that has acquired information on the pinch-out operation of the user changes the clustering condition from "date" to "month" in accordance with the operation. Accordingly, the clustering unit 12 changes the classification destination of the pieces of content 110 from the clusters 120a that are the first clusters to the clusters 120b that are the second clusters.

The pieces of content 110 displayed on the screen 110 gradually move from (a) to (b) and from (b) to (c) in accordance with a pinch-out operation. For such a display, the display control unit 13 acquires information on the opening amount d of the pinch-out operation from the operation acquisition unit 16, and moves the pieces of content 110 from the positions of the clusters 120*a* in (a) to the positions of the clusters 120*b* in (c) in proportion to the opening amount d. Such a movement can be said to be a movement of the pieces of the content 110 from the first position corresponding to the clusters 120*a* toward the second position corresponding to the clusters 120*b*.

There may be a case in which when the granularity of the clustering is changed to a coarser level, the content 110 that has not been displayed on the screen 110 before the change may be newly displayed after the change. In such a case, the display control unit 13 may display an animation in which the newly displayed content 110 enters the screen 100 together with an animation in which the already displayed content 110 moves. For example, the display control unit 13 causes the pieces of content 110 classified as the cluster 120*b* of "August" in (c) to be slid in from the lower end of the screen 100 in accordance with a pinch-out operation as shown in (b).

Further, the display control unit 13 changes the display of the position bar 130 in proportion of the opening amount d. The position bar 130 is displayed in units of months in (1), displayed in units of two months in (b), and displayed in units of three months in (c).

Herein, it is assumed that the pinch-out operation terminates in the state of (b). The condition setting unit 17 acquires from the operation acquisition unit 16 information on the opening amount d at the termination of the pinch-out operation. The condition setting unit 17 compares the opening amount d with a predetermined threshold, and determines, if the opening amount d is greater than or equal to the threshold, a change of the clustering condition to "month." At this time, the clustering unit 12 holds a state in which the pieces of content 110 are classified into the clusters 120*b* based on the clustering condition "month," and the display control unit 13 sets the display of the screen 100 to the state of (c). Meanwhile, if the opening amount d is less than the threshold, the condition setting unit 17 cancels the change of the clustering condition to "month." At this time, the clustering unit 12 discards the state in which the pieces of content 110 are classified into the clusters 120*b* based on the clustering condition "month," and restores the state in which the pieces of content 110 are classified into the clusters 120*b* based on the clustering condition "date." Then, the display control unit 13 restores the display of the screen 100 back to the state in (a).

As described above, in this embodiment, the clustering condition is changed through a pinch-out operation of a user. Although a case in which the granularity of clustering is set coarser through a pinch-out operation has been described above, it is also possible to set the granularity of clustering finer through a pinch-in operation in a similar way.

Continuous Change of Clustering Condition

Figure 4:
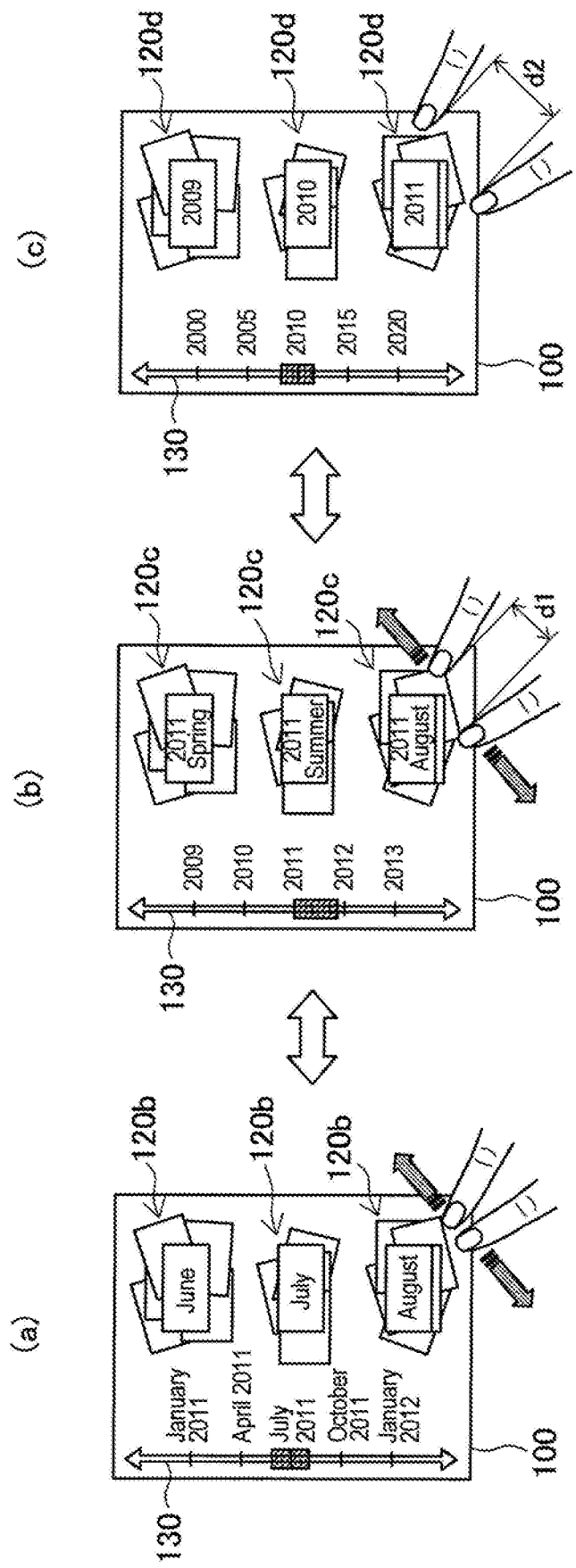
FIG. 4 is a diagram showing an example in which a clustering condition is continuously changed in accordance with the first embodiment of the present disclosure.

FIG. 4 is a diagram showing an example in which a clustering condition is continuously changed in accordance with the first embodiment of the present disclosure. In the example shown, the clustering condition is changed from "month" to "quarter" and further to "year." At this time, on the screen 100, pieces of content 110 move from the positions of clusters 120*b* obtained by classifying the pieces of content 110 based on the clustering condition "month" to the positions of clusters 120*c* obtained by classifying the pieces of content 110 based on the clustering condition "quarter" and further to the positions of clusters 120*d* obtained by classifying the pieces of content 110 based on the clustering condition "year." In FIG. 4, such a movement process is shown by (a) to (c).

In this embodiment, the granularity of clustering related to the attribute "imaging date/time" becomes coarser as the clustering condition changes from "month" to "quarter" and further to "year." That is, the condition setting unit 17 that has acquired a pinch-out operation of a user continuously changes the granularity of clustering to a coarser level in accordance with the operation. Accordingly, the classification destination of the pieces of content 110 is continuously changed from the clusters 120*b* to the clusters 120*c*, and further to the clusters 120*d*.

The pieces of content 110 displayed on the screen 110 move from (a) to (b) and from (b) to (c) in accordance with a pinch-out operation. The changes of display from (a) to (b) and from (b) to (c) are similar to those described with reference to FIG. 3.

Herein, the display control unit 13 and the condition setting unit 17 acquire from the operation acquisition unit 16 information on the opening amount d of a pinch-out operation. If the opening amount d becomes greater, exceeding the opening amount dl where the display of the pieces of content 110 is in the state of (b), the condition setting unit 17 determines a change of the clustering condition to "quarter," and further changes the clustering condition to "year." In such a case, the display control unit 13 further moves the display of the pieces of content 110 from the positions of the clusters 120*c* so that the pieces of content 110 are moved toward the clusters 120*d* shown in (c).

In addition, the display control unit 13 changes the display of the position bar 130 in accordance with the opening amount d as in the example of FIG. 3. The position bar 130 is displayed in units of three months in (a), displayed in units of one year in (b), and displayed in units of five years in (c).

As described above, in this embodiment, a clustering condition is continuously changed through a pinch-out operation of a user. Although a case in which the granularity of clustering is set coarser through a pinch-out operation has been described above, it is also possible to set the granularity of clustering finer through a pinch-in operation in a similar way.

Conclusion of this Embodiment

In the first embodiment of the present disclosure described above, pieces of content are newly clustered through a pinch-out operation of a user as in the series of examples shown in FIGS. 2 to 4, so that the granularity of clustering gradually becomes coarser. Meanwhile, the granularity of content clustering gradually becomes finer through a pinch-in operation of the user, and finally, the pieces of content are in an unclassified state. Such a change of the clustering condition is displayed on the screen 100 as a movement of the pieces of content 110 associated with a pinch operation of the user.

Such operation and display allow the granularity of clustering to be easily adjusted through an intuitive operation that is similar to the operation of enlarging or shrinking a displayed image, for example. In addition, it is also possible to visually grasp a change in granularity of clustering through an operation.

Although the aforementioned description exemplarily shows the "date," "month," "quarter," and "year" as the clustering conditions related to the "imaging date/time," the present disclosure is not limited thereto. For example, clustering conditions related to the "imaging date/time" may be set more finer such as "30 minutes," "1 hour," "3 days," and "10 days." When the clustering conditions are set finer, it becomes possible to, in continuously changing the clustering condition as in the example shown in FIG. 4, steplessly change the granularity of clustering in accordance with a pinch operation.

Although the aforementioned description exemplarily shows a pinch operation of a user on the lower right portion of the screen 100 as an operation acquired by the operation acquisition unit 16, the present disclosure is not limited thereto. For example, a user may perform a pinch operation not only on the lower right portion of the screen 100 but also at any given position on the screen 100. In addition, the operation acquisition unit 16 may acquire a drag or flick operation of a user in a predetermined direction, and the condition setting unit 17 may change the clustering condition in accordance with such operation. In addition, the operation acquisition unit 16 may acquire a pointing operation of a user on a GUI such as a +/− button or a slider bar displayed on the screen 100, and the condition setting unit 17 may change the clustering condition in accordance with such operation.

2. Second Embodiment

Next, a second embodiment of the present disclosure will be described with reference to FIG. 5.

The second embodiment of the present disclosure differs from the aforementioned first embodiment in that the condition setting unit 17 uses the "imaging position" instead of the "imaging date/time" as the attribute of image content. Points other that are similar to those in the aforementioned first embodiment. Thus, detailed description thereof will be omitted.

Operation Example

In this embodiment, the clustering unit 12 classifies pieces of image content. First, in accordance with a pinch operation acquired by the operation acquisition unit 16, the condition setting unit 17 newly sets a clustering condition "district" related to the attribute "imaging position" of the image content, and the clustering unit 12 classifies the pieces of image content into clusters based on the clustering condition "district." Further, in accordance with a pinch operation acquired by the operation acquisition unit 16, the condition setting unit 17 changes the clustering condition to another clustering condition related to the same attribute "imaging position" of the image content.

Herein, the attribute "imaging position" in this embodiment, namely, information on the geographical location can be said to be positional information on the geographical space. In the clustering that is based on the clustering condition "district," the geographical space is split into address areas (districts) of predetermined hierarchical levels, and pieces of content that include positional information in each of the split areas are classified into the same cluster. The address area is a preset area that hierarchically splits a geographical space. In this embodiment, address areas in which the area "district" like "Shibuya" is set as the lowermost layer, the area "prefecture" like "Tokyo" is set as a one level higher layer, and the area "country" like "Japan" is set as a further one level higher layer level, are used, and the granularity of clustering is changed by changing the hierarchical level of the address area.

Figure 5:
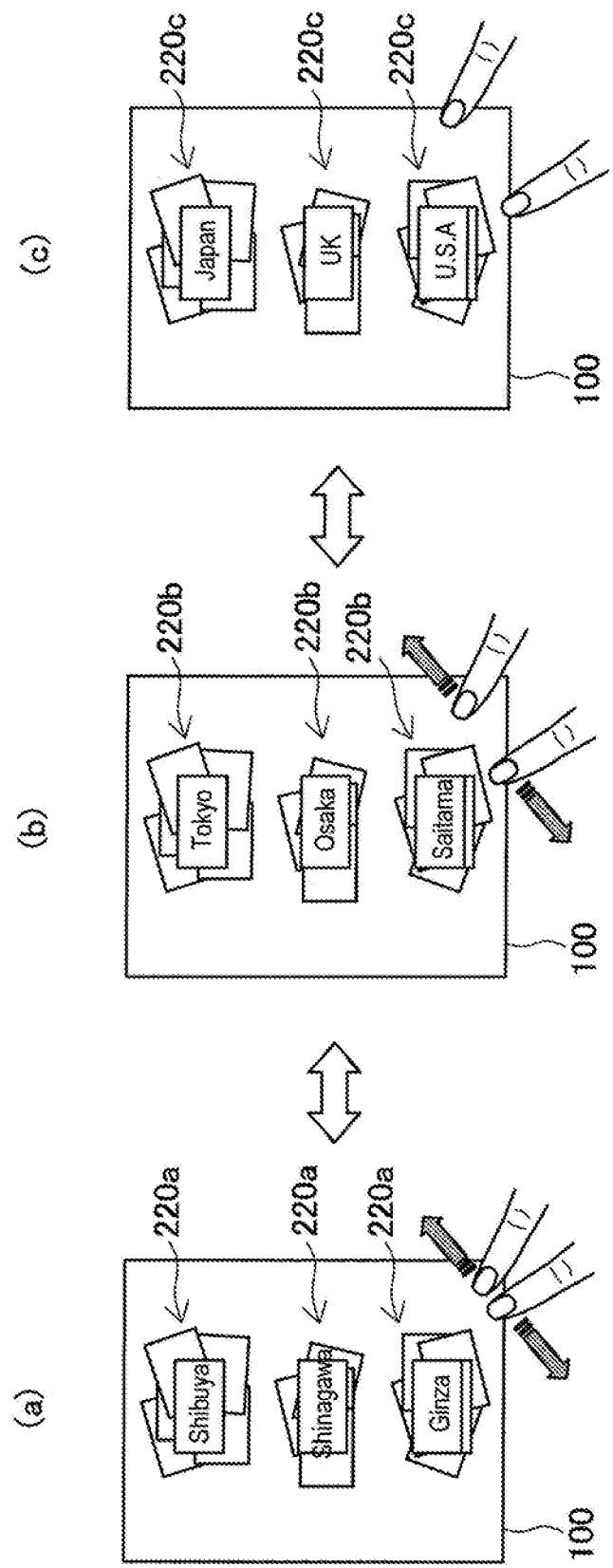
FIG. 5 is a diagram showing an example in which a clustering condition is changed in accordance with a second embodiment of the present disclosure.

FIG. 5 is a diagram showing an example in which a clustering condition is changed in accordance with the second embodiment of the present disclosure. In the example shown, the clustering condition is changed from "district" to "prefecture" and further to "country." At this time, on the screen 100, pieces of content 110 move from the positions of clusters 220a obtained by classifying the pieces of content 110 based on the clustering condition "district" to the positions of clusters 220b obtained by classifying the pieces of content 110 based on the clustering condition "prefecture" and further to the positions of clusters 220c obtained by classifying the pieces of content 110 based on the clustering condition "country." In FIG. 5, the movement process is shown by (a) to (c).

In this embodiment, the granularity of clustering related to the attribute "imaging position" becomes coarser as the clustering condition changes from "district" to "prefecture" and further to "country." That is, the condition setting unit 17 that has acquired a pinch-out operation of a user continuously changes the granularity of clustering to a coarser level in accordance with such operation. Accordingly, the classification destination of the pieces of content 110 is continuously changed from the clusters 220a to the clusters 220b and further to the clusters 220c.

The pieces of content 110 displayed on the screen 100 move from (a) to (b) and from (b) to (c) in accordance with a pinch-out operation. Though not shown, the pieces of content 110 that are moving are also displayed as in the first embodiment. When the pinch-out operation terminates during the movement, the movement amount d of the pinch-out operation is compared with a predetermined threshold, whereby whether to determine or discard a change to the clustering condition is determined.

As described above, in this embodiment, a clustering condition related to the attribute "imaging position" is set and changed through a pinch-out operation of a user like the clustering condition related to the attribute "imaging date/time" in the aforementioned first embodiment. Although a case in which the granularity of clustering is set coarser through a pinch-out operation has been described, it is also possible to set the granularity of clustering finer through a pinch-in operation.

Conclusion of this Embodiment

In the aforementioned second embodiment of the present disclosure, setting of and changing a content clustering condition in accordance with a pinch operation of a user are also applied to the clustering that uses the content attribute "imaging position." In the content classification that uses positional information on the geographical space, it is possible to use a hierarchical level of a predetermined address area as the granularity of clustering. Accordingly, the range and the title of a cluster become closer to the geographical name that the user knows, and thus, the result of clustering becomes more likely to match a result desired by the user.

Although the aforementioned description exemplarily shows the "district," "prefecture," and "country" as the clustering conditions related to the "imaging position," the present disclosure is not limited thereto. For example, the clustering conditions related to the "imaging position" may be set further finely such as "building" and "block." When the clustering conditions are set finely, it becomes possible to, in continuously changing the clustering condition as in the example shown in FIG. 5, steplessly change the granularity of clustering in accordance with a pinch operation.

In addition, for the granularity of clustering, a hierarchical level of an address area need not necessarily be used unlike the aforementioned example. For example, the clustering unit 12 may cluster pieces of content by segmenting a geographical space into grids, and the condition setting unit 17 may change the granularity of clustering by changing the size of the grids.

3. Third Embodiment

Next, a third embodiment of the present disclosure will be described with reference to FIG. 6.

The third embodiment of the present disclosure differs from the first embodiment in that the clustering unit 12 classifies pieces of music content, and the condition setting unit 17 sets a clustering condition that uses different attributes of the pieces of content. Points other than that are similar to those in the first embodiment. Thus, detailed description thereof will be omitted.

Operation Example

In this embodiment, the clustering unit 12 classifies pieces of music content. In this embodiment, pieces of music content are classified and displayed in units of albums. First, in accordance with a pinch operation acquired by the operation acquisition unit 16, the condition setting unit 17 newly sets a clustering condition "artist" related to the attribute "artist" of the music content, and the clustering unit 12 classifies the pieces of music content based on the clustering condition "artist." Further, in accordance with a pinch operation acquired by the operation acquisition unit 16, the condition setting unit 17 changes the clustering condition to a clustering condition related to another attribute "genre" of the music content.

Herein, the attributes "artist" and "genre" in this embodiment are not the positional information unlike in the first and second embodiments. Such attribute is the name of the artist or the genre. Thus, when pieces of content are clustered based on such attribute, pieces of content that have the same artist name or the same genre name are classified into the same cluster.

Figure 6:
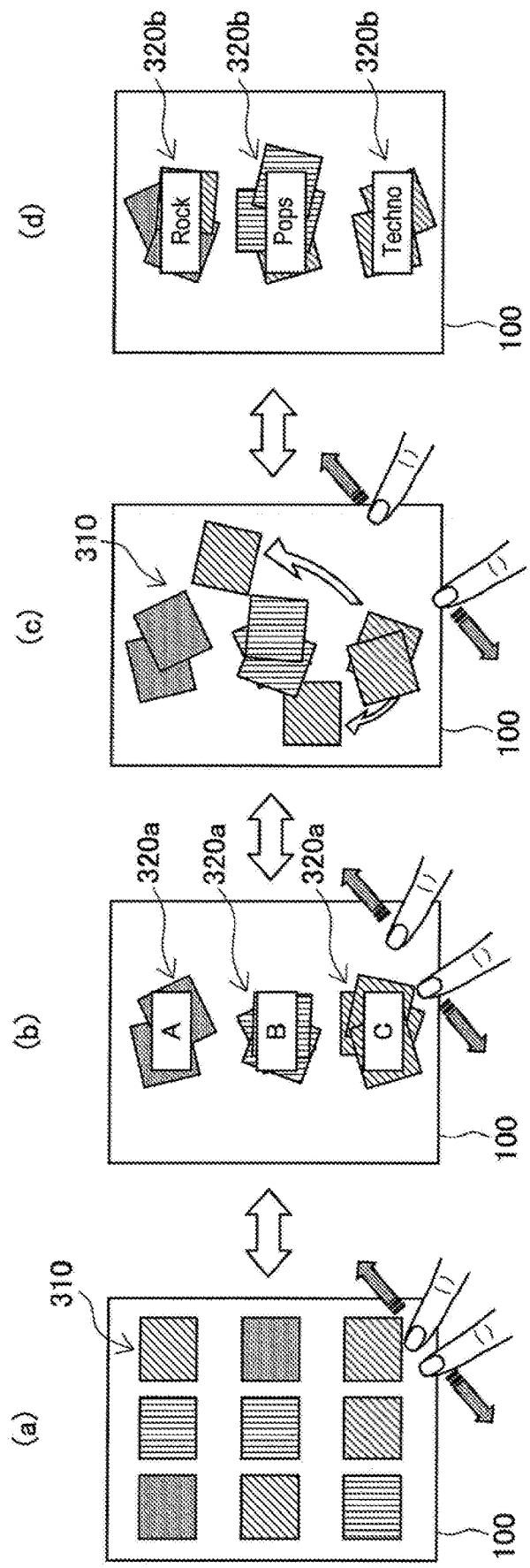
FIG. 6 is a diagram showing an example in which a clustering condition is set and changed in accordance with a third embodiment of the present disclosure.

FIG. 6 is a diagram showing an example in which a clustering condition is set and changed in accordance with the third embodiment of the present disclosure. In the example shown, pieces of content 310 on the screen 100 move from the positions in an unclassified state to the positions of clusters 320a obtained by classifying the pieces of content 310 based on the clustering condition "artist" and further to the positions of clusters 320b obtained by classifying the pieces of content 310 based on the clustering condition "genre." In FIG. 6, such a movement process is shown by (a) to (d).

Herein, the pieces of content 310 are music content displayed in units of albums. The pieces of content 310 can also be said to be a cluster obtained by classifying pieces of music content based on the attribute "album." In this embodiment, the pieces of content 310 displayed in units of albums are classified based on the attributes "artist" and "genre" of the music content. As described above, the clustering unit 12 and the display control unit 13 can handle clusters, which have been obtained by classifying pieces of content based on a given clustering condition, as content when classifying them based on another clustering condition. The pieces of content 310 can be displayed on the screen 100 as icons obtained by shrinking sleeve images of albums, for example.

In the state of (a), the clustering unit 12 does not have set thereon a clustering condition for pieces of music content displayed in units of albums. Therefore, the pieces of content 310 are displayed as they are on the screen 100 without being clustered. Herein, a user starts a pinch operation on the display 14. As shown in FIG. 6, this pinch operation corresponds to a pinch-out operation on the lower right portion of the screen 100.

The condition setting unit 17 that has acquired information on the pinch-out operation of the user via the touch panel 15 and the operation acquisition unit 16 changes the clustering condition from the unset state to a state in which the clustering condition "artist" related to the attribute "artist" of the music content is set. Accordingly, the clustering unit 12 classifies the pieces of content 310 into the clusters 320a based on the clustering condition "artist."

The pieces of content 310 displayed on the screen 100 move in accordance with a pinch-out operation, and become a state in which the pieces of content 310 are classified into the clusters 320a. The clusters 320a can be displayed with the artist names "A," "B," and "C." When a pinch-out operation is further continued in the state of (b), the condition setting unit 17 determines the change of the clustering condition to "artist," and further changes the clustering condition to "genre." In such a case, the display control unit 13 further changes the display of the content 110 from the state in which the content 110 is classified into the clusters 320a, and moves the content 110 toward the clusters 320b shown in (d).

Herein, the attributes "artist" and "genre" are attributes that have a certain degree of relevance but are set independently. That is, there may be a case in which pieces of music content of the same artist belong to different genres. For example, (c) shows an example in which there exist pieces of content 310 that move from the cluster 320a of "C" obtained by classifying the pieces of content based on the clustering condition "artist" toward a cluster 320b of "Rock" or toward a cluster 320b of "Pops," or remain to form a cluster 320b of "Techno" according to the clustering condition "genre." Displaying such movement of the pieces of content 310 can clarify the relationship of the pieces of content among different attributes.

Conclusion of this Embodiment

In the third embodiment of the present disclosure described above, setting of and changing a content clustering condition in accordance with a pinch operation of a user are also applied to the clustering that uses different content attributes such as "artist" and "genre" of music content. Accordingly, it is possible to change the attribute used for content clustering through a simple operation. In addition, it is also possible to visually grasp a change in the result of clustering executed by changing the attribute.

Although the aforementioned description exemplarily shows "album," "artist," and "genre" as the attributes of music content, the present disclosure is not limited thereto. For example, attributes such as "composer" and "release year" may be used for classification.

4. Fourth Embodiment

Next, a fourth embodiment of the present disclosure will be described with reference to FIGS. 7 and 8.

The fourth embodiment of the present disclosure differs from the aforementioned first embodiment in that the operation acquisition unit 16 acquires a drag operation instead of a pinch operation of a user, and the display control unit 13 and the condition setting unit 17 switch a process between a case in which the drag operation is a single-touch drag operation and a case in which the drag operation is a multi-touch drag operation. Points other than that are similar to those in the first embodiment. Thus, detailed description will be omitted.

Operation Example

Figure 7:
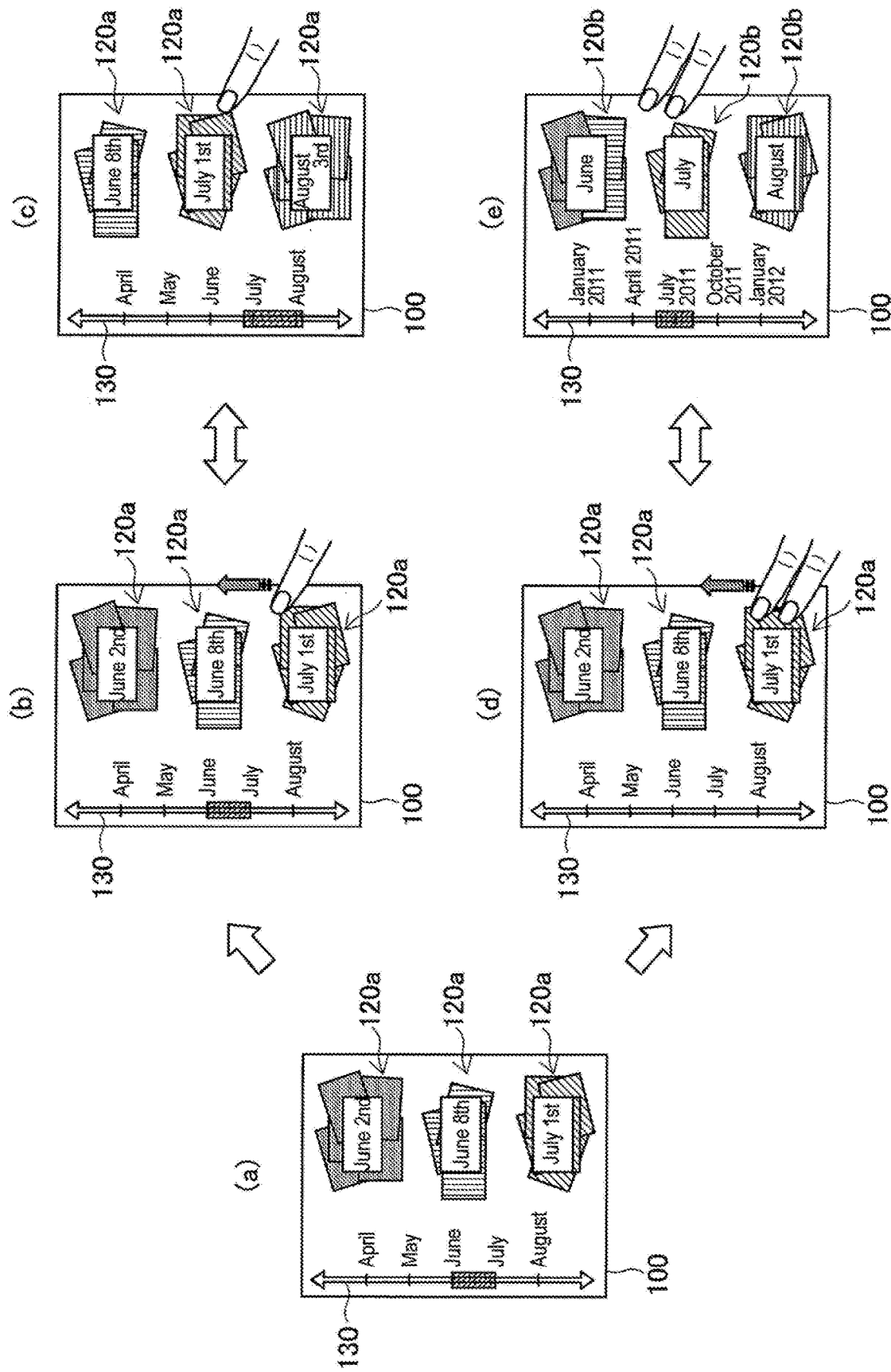
FIG. 7 is a diagram showing an example in which switching is performed between a change of a clustering condition and scrolling of a display in accordance with a fourth embodiment of the present disclosure.

FIG. 7 is a diagram showing an example in which switching is performed between a change of a clustering condition and scrolling of a display in accordance with the fourth embodiment of the present disclosure.

In this embodiment, the clustering unit 12 classifies pieces of image content using the attribute "imaging date/time" as in the aforementioned first embodiment. In the state of (a), pieces of content 110 are classified into clusters 120*a* based on the clustering condition "date" as in the example shown in FIG. 2(*d*).

Then, the display of the screen 100 changes in two ways according to the types of an operation of a user acquired by the operation acquisition unit 16. One is a display when the operation acquisition unit 16 acquires a single-touch drag operation, and is shown as (b) and (c). The other is a display when the operation acquisition unit 16 acquires a multi-touch drag operation, and is shown as "d" and "e." Herein, the multi-touch drag operation and the single-touch drag operation can be said to be first and second movement operations of the user, respectively.

When the operation acquisition unit 16 acquires a single-touch drag operation in (b), the condition setting unit 17 does not change the content clustering condition. Meanwhile, the display control unit 13 scrolls the display of the pieces of content 110 and the clusters 120*a* in accordance with the drag operation. Consequently, in (c), classification of the pieces of content 110 into the clusters 120*a* does not change, but the display of the screen 100 is scrolled. Specifically, although the clusters 120*a* of "June 2nd" to "July 1st" are displayed in (b), the clusters 120*b* of "June 8th" to "August 3rd" are displayed in (c). In addition, the display control unit 13 moves the display position of the position bar 130 in accordance with the scroll.

Meanwhile, when the operation acquisition unit 16 acquires a multi-touch drag operation in (d), the condition setting unit 17 changes the content clustering condition. Specifically, the condition setting unit 17 changes the content clustering condition from "date" to "month." Accordingly, the display control unit 13 moves the pieces of content 110 from the positions of the clusters 120*a* in (d) to the positions of the clusters 120*b* in (e). In addition, the display control unit 13 changes the display of the position bar 130 in accordance with the change of classification.

Note that FIG. 7 shows an example in which the display is scrolled upward or the granularity of clustering is set coarser through an upward drag operation. However, likewise, it is also possible to scroll the display downward or set the granularity of clustering finer through a downward drag operation.

Figure 8:
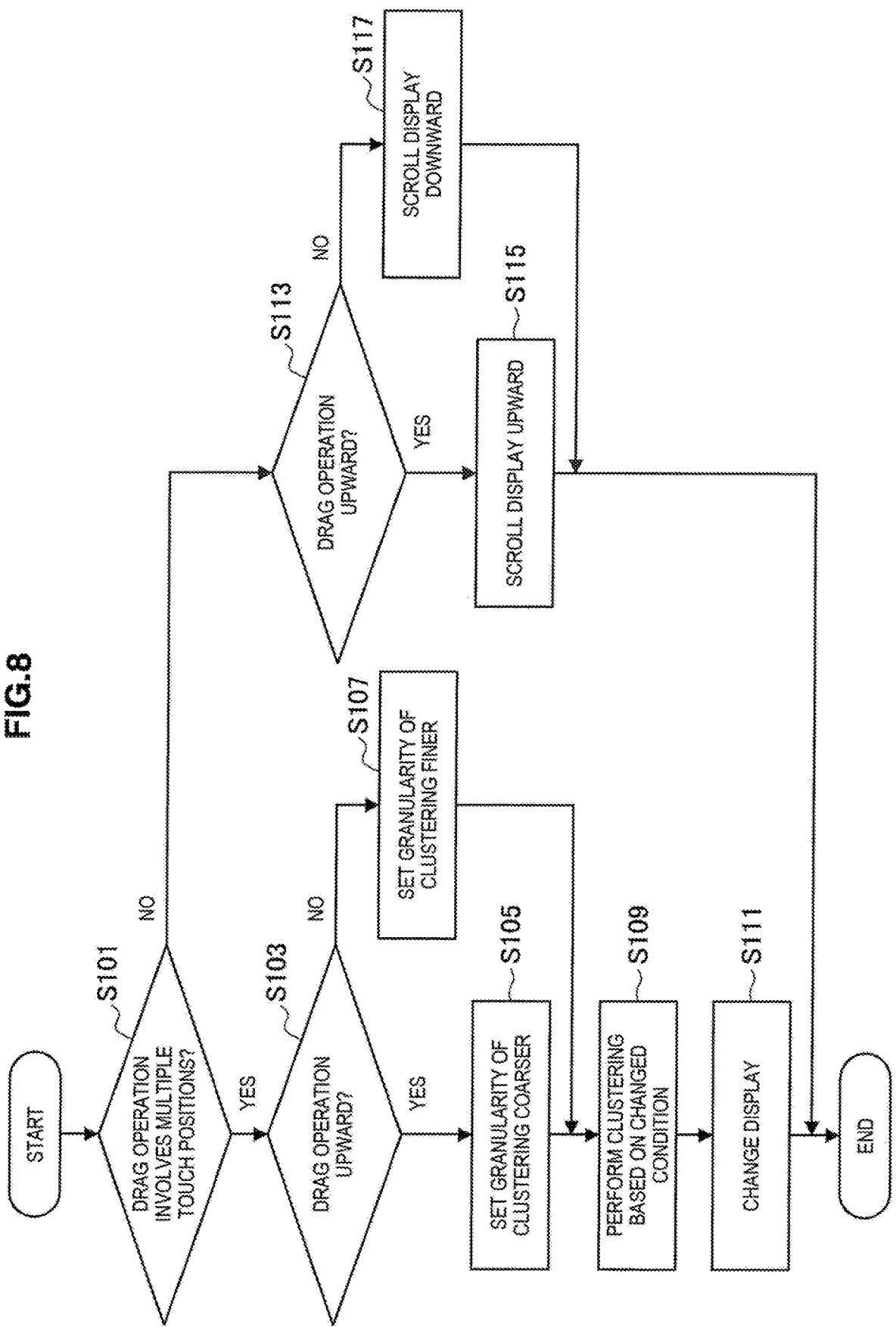
FIG. 8 is a flowchart showing a process of an information processing device in accordance with the fourth embodiment of the present disclosure.

FIG. 8 is a flowchart showing a process of the information processing device 10 in accordance with the fourth embodiment of the present disclosure. For simplicity of the description, FIG. 8 shows a process performed when the operation acquisition unit 16 acquires a drag operation in the vertical direction on the screen 100. Other than the process shown in FIG. 8, a process performed when another type of operation or a drag operation in a different direction is acquired can also be set additionally.

First, the display control unit 13 and the condition setting unit 17 determine whether a drag operation of a user acquired by the operation acquisition unit 16 has multiple contact positions, that is, multiple touches or a single touch (step S101). Herein, if the drag operation is determined to be a multi-touch drag operation, a clustering granularity changing process of from step S103 is executed. Meanwhile, if the drag operation is not determined to be a multi-touch drag operation, that is, determined to be a single-touch drag operation, a display scrolling process of from step S113 is executed.

In the clustering granularity changing process, the condition setting unit 17 first determines if the drag operation is upward (step S103). Herein, if the drag operation is determined to be upward, the condition setting unit 17 sets the granularity of clustering coarser (step S105). In this case, in the aforementioned example, the clustering condition is changed from "date" to "month" or from "month" to "quarter." Meanwhile, if the drag operation is not determined to be upward in step S103, that is, if the drag operation is determined to be downward, the condition setting unit 17 sets the granularity of clustering finer (step S107). In this case, in the aforementioned example, the clustering condition is changed from "quarter" to "month" or from "month" to "date."

Next, the condition setting unit 17 provides the clustering condition changed in step S105 or in step S107 to the clustering unit 12, and the clustering unit 12 executes content clustering based on the provided condition (step S109). Next, the clustering unit 12 provides the result of clustering to the display control unit 13, and the display control unit 13 changes the display so that the pieces of content 110 move toward the new clusters 120 on the screen 100 as in the aforementioned example.

Meanwhile, in the display scrolling process, the display control unit 13 first determines if the drag operation is upward (step S113). Herein, if the drag operation is determined to be upward, the display control unit 13 scrolls the display upward (step S115). Meanwhile, if the drag operation is not determined to be upward, that is, if the drag operation is determined to be downward, the display control unit 13 scrolls the display downward (step S117).

Through the aforementioned process, switching is performed between the clustering condition changing operation and the scroll operation.

Conclusion of this Embodiment

In the fourth embodiment of the present disclosure described above, as in the example shown in FIGS. 7 and 8, for example, with regard to the first and second movement operations in the same direction, switching is performed as to whether to change the clustering condition or to scroll the display in accordance with the type of the movement operation.

Accordingly, it becomes possible to, while allowing a display scroll operation through a single-touch drag operation, change the granularity of clustering through a multi-touch drag operation in the same direction. As an additional operation icon need not be displayed, display of the GUI can be simplified, and other operations can be assigned to other types of operations such as a flip operation and a pinch operation.

Although the aforementioned description illustrates an example in which the display is scrolled through a single-touch drag operation in the vertical direction of the screen and the granularity of clustering is changed through a multi-touch drag operation, the present disclosure is not limited thereto. For example, the display may be scrolled through a multi-touch drag operation in the vertical direction of the screen and the granularity of clustering may be changed through a single-touch drag operation. The direction of the drag operation is not limited to the vertical direction of the screen 100, and may be the horizontal direction or the like. Further, a movement operation such as a flick operation may be used instead of a drag operation.

5. Fifth Embodiment

Next, a fifth embodiment of the present disclosure will be described with reference to FIGS. 9 to 12.

The fifth embodiment of the present disclosure differs from the aforementioned first embodiment in that the clustering unit 12 clusters pieces of content using a plurality of attributes and the condition setting unit 17 switches a process according to the direction of a pinch operation. Points other than that are similar to those in the aforementioned first embodiment. Thus, description thereof will be omitted.

Operation Example

Figure 9:
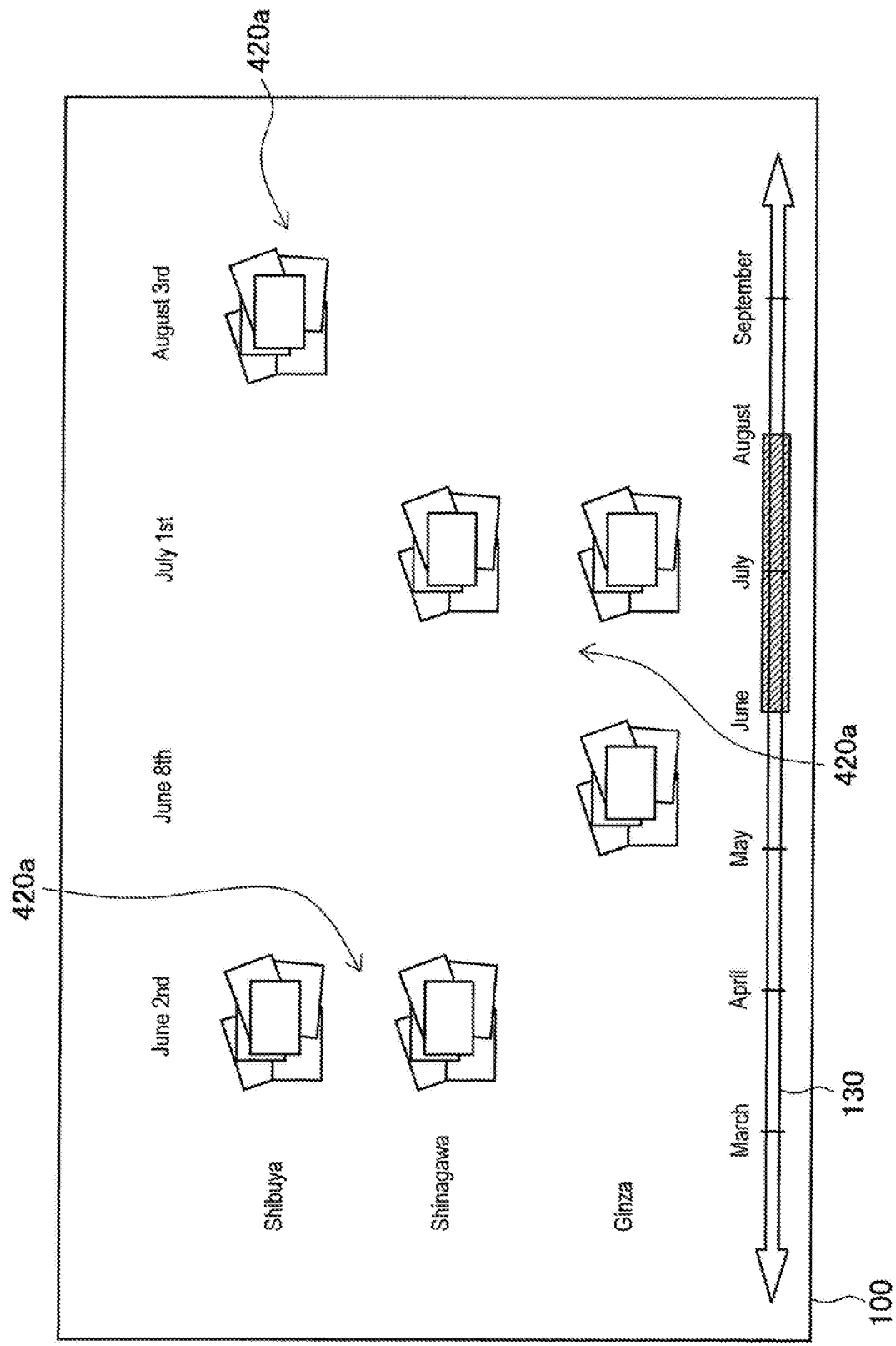
FIG. 9 is a diagram showing an example in which a change of the clustering granularity is switched for a plurality of attributes in accordance with a fifth embodiment of the present disclosure.
Figure 10:
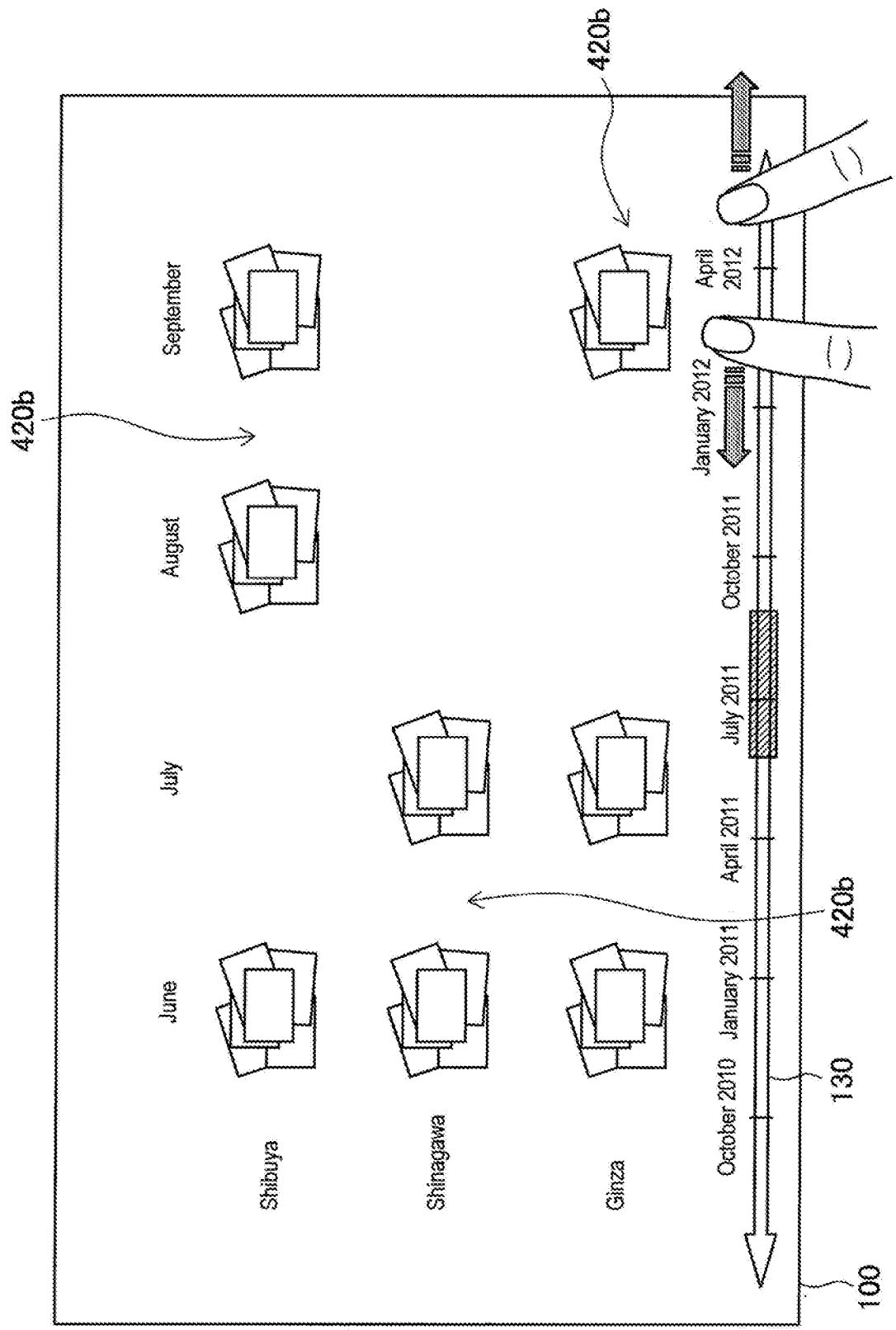
FIG. 10 is a diagram showing an example in which a change of the clustering granularity is switched for a plurality of attributes in accordance with the fifth embodiment of the present disclosure.
Figure 11:
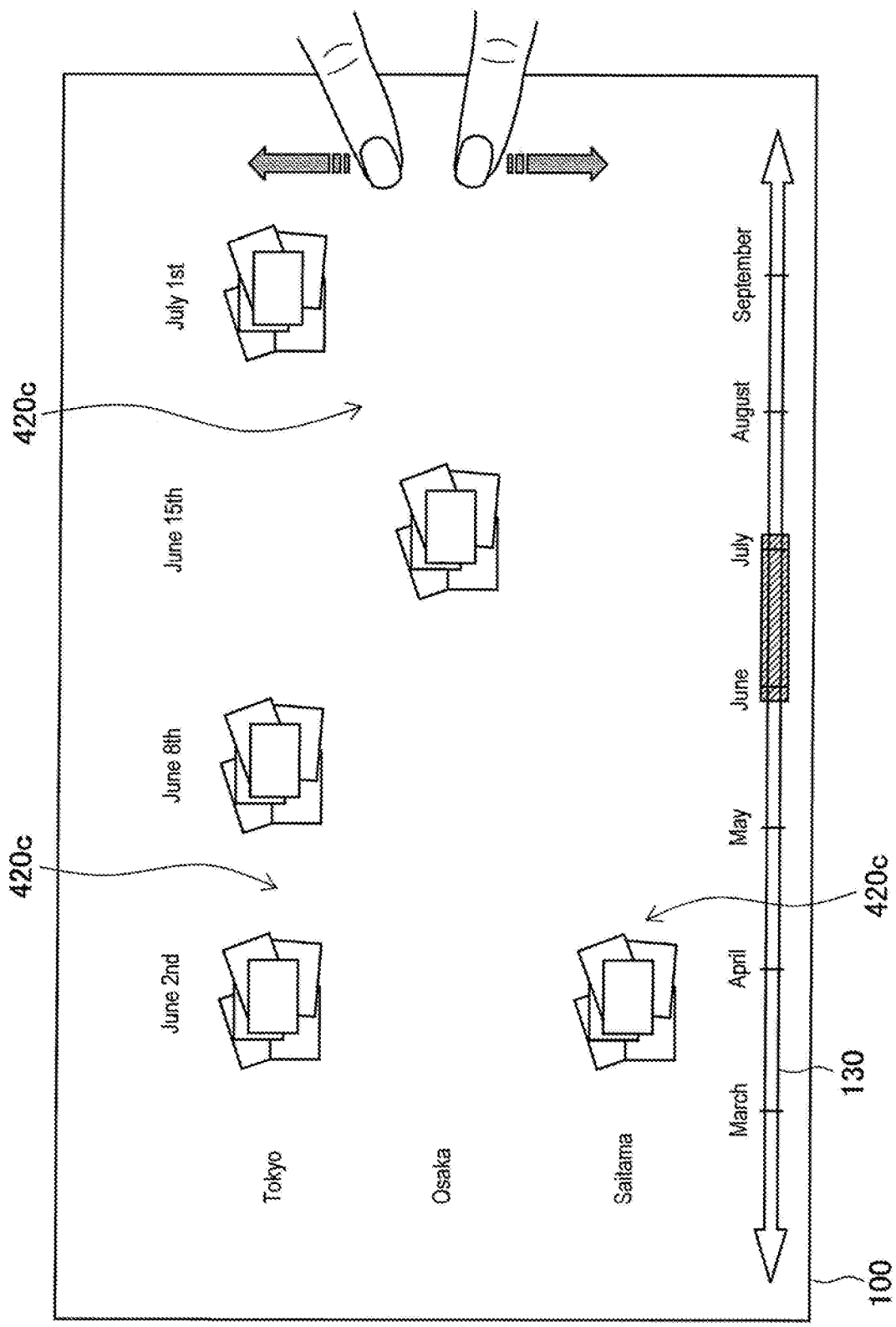
FIG. 11 is a diagram showing an example in which a change of the clustering granularity is switched for a plurality of attributes in accordance with the fifth embodiment of the present disclosure.

FIGS. 9 to 11 are diagrams showing examples in which a change of the clustering granularity is switched among a plurality of attributes in accordance with the fifth embodiment of the present disclosure.

In this embodiment, the clustering unit 12 classifies pieces of image content using the attribute "imaging date/time" and the attribute "imaging position." For example, as shown in FIG. 9, the clustering unit 12 classifies pieces of content 110 into clusters 420a created based on the clustering conditions "date, district." Accordingly, the pieces of content 110 are clustered into content that were captured on the same date and in the same district, such as, for example, "content captured in Shibuya on June 2nd," "content captured in Shinagawa on June 2nd," and "content captured in Shibuya on August 3rd."

Herein, the attributes "imaging date/time" and "imaging position" in this embodiment are positional information on the time axis and on the geographical space, respectively, and can be referred to as first and second positional information. As described in the aforementioned first embodiment, in the clustering that uses positional information on the time axis, the granularity of clustering is changed by changing the length that splits the time axis. Meanwhile, as described in the aforementioned second embodiment, in the clustering that uses positional information on the geographical space, the granularity of clustering is changed by changing the hierarchical level of an address area used for the clustering. As described above, the granularity of clustering can be changed for each of the first and second positional information used in this embodiment. In this embodiment, for which of the first and second positional information the clustering granularity should be changed is switched according to the direction of a user operation.

The display control unit 13 displays the result of clustering, which uses the aforementioned two pieces of positional information, on the display 14 as the screen 100. On the screen 100, a clustering condition related to the attribute "imaging date/time" is displayed on the horizontal axis, and a clustering condition related to the "attribute "imaging position" is displayed on the vertical axis, and the clusters 420a are represented by the coordinates of the two axes. That is, a cluster 420a located at "June 2nd" on the horizontal axis and located at "Shibuya" on the vertical axis is "content captured in Shibuya on June 2nd." The display control unit 13 may further display the position bar 130 on the screen 100. The position bar 130 is similar to the position bar 130 displayed in the first embodiment or the like. In this embodiment, the position bar 130 is displayed in the horizontal direction as the clustering condition related to the attribute "imaging date/time" is represented on the horizontal axis in this embodiment.

FIG. 10 shows a state in which the operation acquisition unit 16 acquires a pinch operation in the horizontal direction of the screen 100 in the state of FIG. 9. At this time, the condition setting unit 17 changes the clustering condition related to the attribute "imaging date/time" from "date" to "month." Accordingly, the clustering unit 12 classifies the pieces of content 110 into clusters 420b created based on the clustering conditions "month, district." Accordingly, the pieces of content 110 are clustered into content that were captured in the same month and in the same district, such as, for example, "content captured in Shibuya in June," "content captured in Shinagawa in June," and "content captured in Shibuya in August."

The display control unit 13 changes the display of the screen 100 in accordance with the result of clustering. Herein, the classification of the "district" on the vertical axis does not change but the classification on the horizontal axis changes from "date" to "month." Thus, the clusters 420a converge in the horizontal direction, forming a cluster 420b. In addition, the display control unit 13 changes the display of the position bar 130 from units of one month to units of three months in accordance with the change in the clustering condition related to the attribute "imaging date/time."

FIG. 11 shows a state in which the operation acquisition unit 16 acquires a pinch operation in the vertical direction. At this time, the condition setting unit 17 changes the clustering condition related to the attribute "imaging position" from "district" to "prefecture." Accordingly, the clustering unit 12 classifies the pieces of content 110 into clusters 420c created based on the clustering conditions "date, prefecture." Accordingly, the pieces of content 110 are clustered into content that were captured on the same day and in the same prefecture, such as, for example, "content captured in Tokyo on June 2nd," "content captured in Saitama on June 2nd," and "content captured in Tokyo on June 8th."

The display control unit 13 changes the display of the screen 100 in accordance with the result of clustering. Herein, the classification of "date" on the horizontal axis does not change, but the classification on the vertical axis changes from "district" to "prefecture." Thus, the clusters 420a converge in the vertical direction, forming a cluster 420c. The clustering condition related to the attribute "imaging date/time" does not change. Thus, the display control unit 13 does not change the display of the position bar 130.

Figure 12:
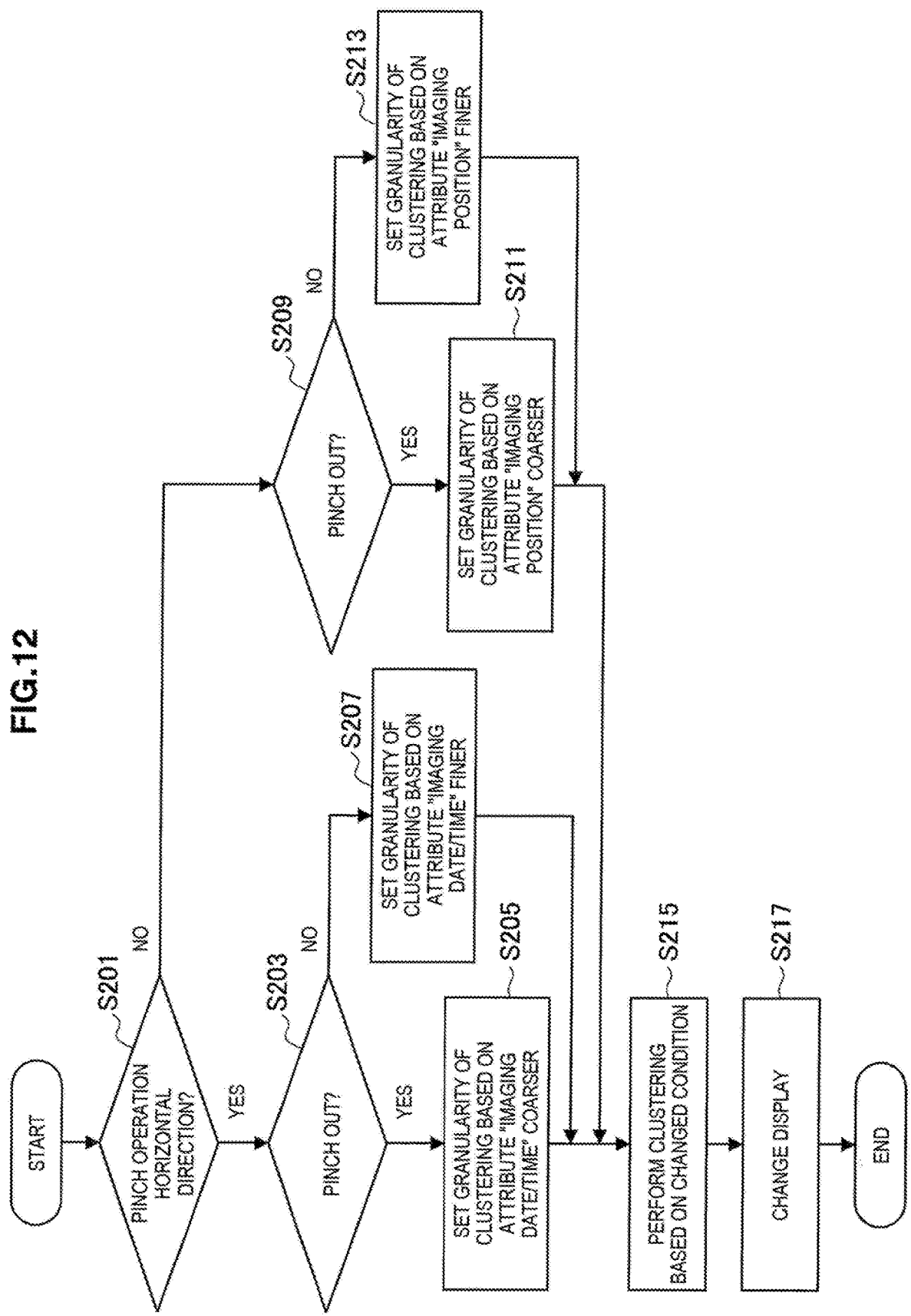
FIG. 12 is a flowchart showing a process of an information processing device in accordance with the fifth embodiment of the present disclosure.

FIG. 12 is a flowchart showing a process of the information processing device 10 in accordance with the fifth embodiment of the present disclosure. Note that for simplicity of description, FIG. 12 shows a process performed when the operation acquisition unit 16 acquires a pinch operation in the horizontal direction or the vertical direction of the screen 100. Other than the process shown in FIG. 12, a process performed when another type of operation is acquired can be additionally set.

First, the condition setting unit 17 determines if a pinch operation of a user acquired by the operation acquisition unit 16 is a pinch operation in the horizontal direction (step S201). Herein, if the pinch operation is determined to be a pinch operation in the horizontal direction, a clustering granularity changing process for the attribute "imaging date/time" of from step S203 is executed. Meanwhile, if the pinch operation is not determined to be a pinch operation in the horizontal direction, that is, if the pinch operation is determined to be a pinch operation in the vertical direction, a clustering granularity changing process for the attribute "imaging position" of from step S209 is executed.

In the clustering granularity changing process for the attribute "imaging date/time," the condition setting unit 17 first determines if the pinch operation is pinch-out (step S203). Herein, if the pinch operation is determined to be pinch-out, the condition setting unit 17 sets the granularity of clustering based on the attribute "imaging date/time" coarser (step S205). In this case, in the aforementioned example, the clustering condition is changed from "date" to "month" or from "month" to "quarter." Meanwhile, if the pinch operation is not determined to be pinch out, that is, if the pinch operation is determined to be pinch-in, the condition setting unit 17 sets the granularity of clustering based on the attribute "imaging date/time" finer (step S207). In this case, in the aforementioned example, the clustering condition is changed from "quarter" to "month" or from "month" to "date."

In the clustering granularity changing process for the attribute "imaging position," the condition setting unit 17 determines if the pinch operation is pinch-out (step S209). Herein, if the pinch operation is determined to be pinch-out, the condition setting unit 17 sets the granularity of clustering based on the attribute "imaging position" coarser (step S211). In this case, in the aforementioned example, the clustering condition is changed from "district" to "prefecture" or from "prefecture" to "country." Meanwhile, if the pinch operation is not determined to be pinch-out, that is, if the pinch operation is determined to be pinch-in, the condition setting unit 17 sets the granularity of clustering based on the attribute "imaging position" finer (step S213). In this case, in the aforementioned example, the clustering condition is changed from "country" to "prefecture" or from "prefecture" to "district."

After the clustering granularity changing process for the attribute "imaging date/time" or "imaging position," the condition setting unit 17 provides the changed clustering condition to the clustering unit 12, and the clustering unit 12 executes clustering of content based on the provided condition (step S215). Next, the clustering unit 12 provides the result of clustering to the display control unit 13, and the display control unit 13 changes the display so that the pieces of content 110 move toward the new clusters 420 on the screen as in the aforementioned example (step S217).

Through the aforementioned process, in this embodiment, a change of the clustering granularity is switched among a plurality of attributes.

Conclusion of this Embodiment

In the fifth embodiment of the present disclosure described above, a change of the clustering granularity is switched among a plurality of attributes according to the direction of a user operation as in the examples shown in FIGS. 9 to 12.

Accordingly, when pieces of content are clustered using two types of attributes, for example, it is possible to change the granularity of clustering for each attribute through an intuitive operation. At this time, if the directions in which the two types of attributes are represented as positions are made to coincide with directions of user operations for changing the granularity of clustering based on the respective attributes, the operations of changing the granularity of clustering based on the respective attributes become more intuitive.

Although the aforementioned description illustrates an example in which the granularity of clustering is changed through a pinch operation, the present disclosure is not limited thereto. For example, the granularity of clustering may be changed through a drag operation, a flick operation, or the like. When the granularity of clustering is changed through a drag operation, for example, this embodiment may be combined with the aforementioned fourth embodiment. In that case, the display is scrolled in the vertical direction or the horizontal direction by a single-touch drag operation, and the clustering granularity is changed for one of the two types of attributes by a multi-touch drag operation.

6. Supplement

Hardware Configuration

The hardware configuration of an information processing device 900 that can implement the information processing device 10 in accordance with the aforementioned embodiment of the present disclosure will be described with reference to FIG. 13.

Figure 13:
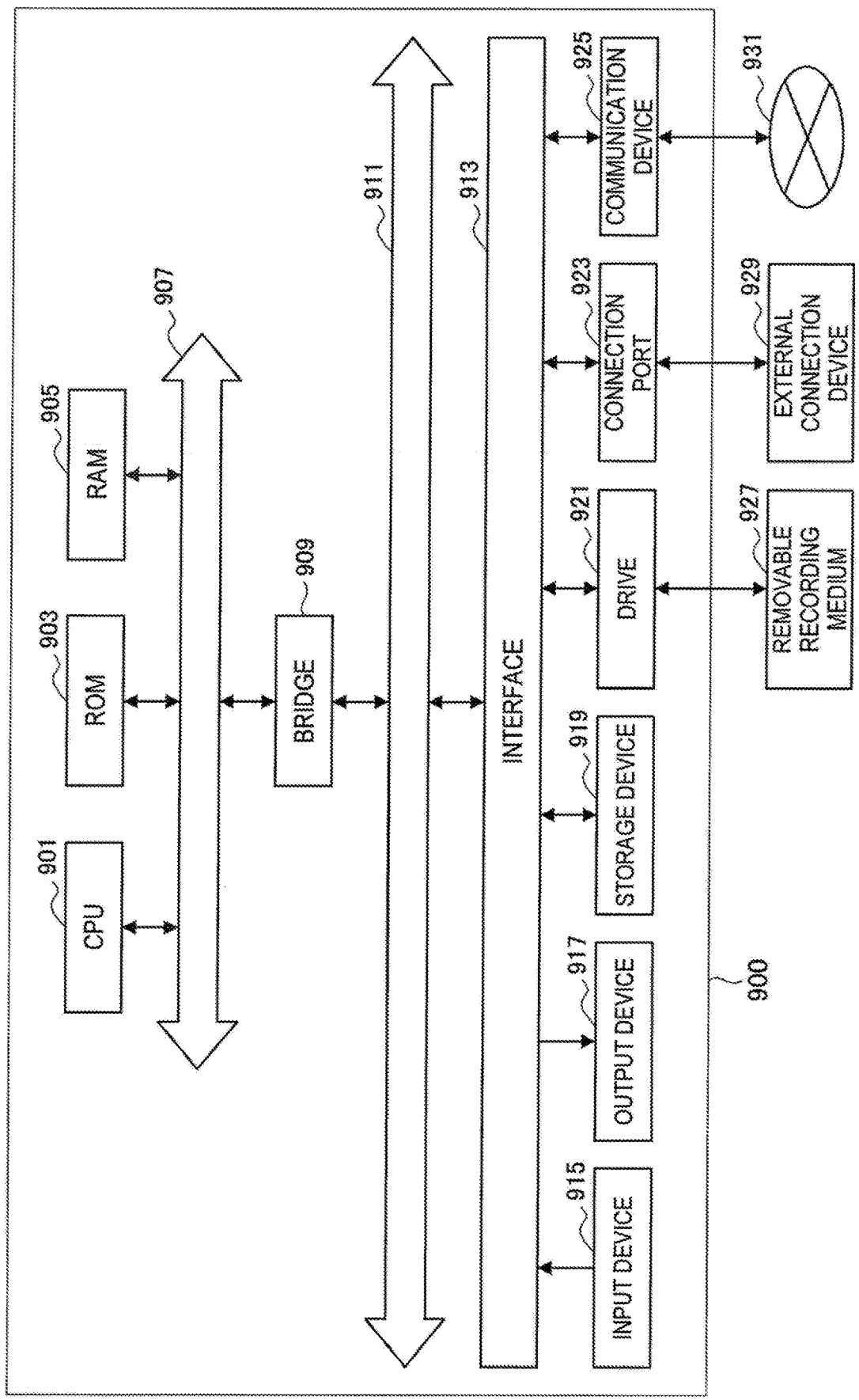
FIG. 13 is a block diagram illustrating the hardware configuration of an information processing device.

FIG. 13 is a block diagram illustrating the hardware configuration of an information processing device.

The information processing device 900 includes a CPU 901, ROM 903, and RAM 905. Further, the information processing device 900 may include a host bus 907, a bridge 909, an external bus 911, an interface 913, an input device 915, an output device 917, a storage device 919, a drive 921, a connection port 923, and a communication device 925.

The CPU 901 functions as an arithmetic processing unit and a control unit, and controls the entire operation within the information processing device 900 or a part thereof in accordance with various programs recorded on the ROM 903, the RAM 905, the storage 919, or the removable recording medium 927. The ROM 903 stores programs, operation parameters, and the like used by the CPU 901. The RAM 905 temporarily stores programs used in the execution of the CPU 901, parameters that change as appropriate during the execution, and the like. The CPU 901, the ROM 903, and the RAM 905 are mutually connected by a host bus 907 constructed from an internal bus such as a CPU bus. Further, the host bus 907 is connected to the external bus 911 such as a PCI (Peripheral Component Interconnect/Interface) via the bridge 909.

The input device 915 is a device used by a user such as, for example, a mouse, a keyboard, a touch panel, a button, a switch, or a lever. The input device 915 may be, for example, a remote control device that uses infrared rays or other radio waves, or an external connection device 929 such as a portable phone corresponding to the operation of the information processing device 900. The input device 915 includes an input control circuit that generates an input signal based on information input by a user and outputs the input signal to the CPU 901. The user can, by operating the input device 915, input various data to the information processing device 900 or instruct the information processing device 900 to perform a processing operation.

The output device 917 includes a device that can visually or audibly inform a user of the acquired information. The output device 917 can be, for example, a display device such as an LCD (liquid crystal display), a PDP (Plasma Display Panel,) an organic EL (Electro-Luminescence) display; an audio output device such as a speaker or headphones; or a printer device. The output device 917 outputs the result obtained through the processing of the information processing device 900 as text or video such as an image or as sound such as voice or audio.

The storage device 919 is a device for storing data, constructed as an example of a storage unit of the information processing device 900. The storage device 919 includes, for example, a magnetic storage device such as HDD (Hard Disk Drive), a semiconductor storage device, an optical storage device, or a magneto-optical storage device. This storage device 929 includes, for example, programs or various data executed by the CPU 901 or various data acquired from the outside.

The drive 921 is a reader/writer for a removable recording medium 927 such as a magnetic disk, an optical disc, a magneto-optical disk, or semiconductor memory, and is incorporated in or externally attached to the information processing device 900. The drive 921 reads information recorded on a removable recording medium 927 that is mounted, and outputs the information to the RAM 905. The drive 921 also writes information to the removable recording medium 927 that is mounted.

The connection port 923 is a port for directly connecting a device to the information processing device 900. The connection port 923 can be, for example, a USB (Universal Serial Bus) port, an IEEE 1394 port, or a SCSI (Small Computer System Interface) port. In addition, the connection port 923 may be an RS-232 port, an optical audio terminal, or a HDMI (High-Definition Multimedia Interface) port. When the external connection device 929 is connected to the connection port 923, the information processing device 900 and the external connection device 929 can exchange various data.

The communication device 925 is, for example, a communication interface including a communication device or the like for connection to a communications network 931. The communication device 925 can be, for example, a wired or wireless LAN (Local Area Network) or a communication card for Bluetooth (registered trademark) or WUSB (Wireless USB). Alternatively, the communication device 925 may be a router for optical communication, a router for ADSL (Asymmetric Digital Subscriber Line), or a modem for various communication. The communication device 925 transmits or receives signals or the like via the Internet or to/from other communication devices, for example, using a predetermined protocol such as TCP/IP. In addition, the communications network 931 connected to the communication device 925 is a network connected by wire or wirelessly, and is, for example, the Internet, a home LAN, infrared communication, radio wave communication, or satellite communication.

An exemplary hardware configuration of the information processing device 900 has been described above. Each of the aforementioned components may be configured using general members or specialized hardware for the function of each component. Such a configuration can be changed as appropriate according to the technology level in implementation.

Variation

Although the information processing device that acquires a user operation using a touch panel has been described in the embodiment above, the present disclosure is not limited thereto. The information processing device can acquire a user operation by various methods such as, for example, a pointing device such as a mouse or recognition of a user action. The type or direction of a user operation shown in the aforementioned embodiment can be appropriately defined in accordance with an example of the aforementioned embodiment.

Supplement

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Additionally, the present technology may also be configured as below.

(1) An information processing device comprising:
  a display control unit configured to display pieces of content at a first position of a screen;
  a condition setting unit configured to set a clustering condition for the pieces of content in accordance with a user operation; and
  a clustering unit configured to classify the pieces of content into a cluster in accordance with the clustering condition,
  wherein the display control unit moves a display of the pieces of content from the first position toward a second position corresponding to the cluster.

(2) The information processing device according to (1), wherein
  the display control unit displays the pieces of content classified into a first cluster in accordance with a first clustering condition at the first position corresponding to the first cluster,
  the condition setting unit sets a second clustering condition for the pieces of content in accordance with the user operation,
  the clustering unit classifies the pieces of content into a second cluster in accordance with the second clustering condition, and
  the display control unit moves the display of the pieces of content from the first position toward the second position corresponding to the second cluster.

(3) The information processing device according to (2), wherein
  each of the pieces of content has positional information as an attribute,
  the clustering unit classifies the pieces of content into the cluster by classifying the positional information at a first granularity in accordance with the clustering condition, and
  the first granularity differs between the first clustering condition and the second clustering condition.

(4) The information processing device according to (2) or (3), wherein
  the condition setting unit sets the second clustering condition that differs between a first case in which the user operation is an operation in a first direction of the screen and a second case in which the user operation is an operation in a second direction of the screen, the second screen differing from the first direction.

(5) The information processing device according to (4), wherein
each of the pieces of content has first and second positional information as attributes,
the clustering unit classifies the pieces of content into the cluster by classifying the first positional information at a first granularity and classifying the second positional information at a second granularity in accordance with the clustering condition,
in the first case, the first granularity differs between the first clustering condition and the second clustering condition, and
in the second case, the second granularity differs between the first clustering condition and the second clustering condition.

(6) The information processing device according to (5), wherein
the first positional information is represented by a position in the first direction on the screen, and the second positional information is represented by a position in the second direction on the screen.

(7) The information processing device according to (6), wherein
the first positional information is information on time on a time axis,
the first granularity is a length that divides the time axis,
the second positional information is positional information in a geographical space, and
the second granularity is a hierarchical level of a predetermined address area used for dividing the geographical space.

(8) The information processing device according to (2), wherein
each of the pieces of content has a plurality of attributes,
the clustering unit classifies the pieces of content into the cluster using at least one attribute among the plurality of attributes in accordance with the clustering condition, and
the at least one attribute differs between the first clustering condition and the second clustering condition.

(9) The information processing device according to any one of (1) to (8), wherein
the user operation includes a first or second movement operation in a first direction,
the condition setting unit sets the clustering condition in accordance with the first movement operation, and
the display control unit scrolls a display of the screen in the first direction in accordance with the second movement operation.

(10) An information processing method comprising:
displaying pieces of content at a first position of a screen;
setting a clustering condition for the pieces of content in accordance with a user operation;
classifying the pieces of content into a cluster in accordance with the clustering condition; and
moving a display of the pieces of content from the first position toward a second position corresponding to the cluster.

(11) A program for causing a computer to implement:
(a) a function of displaying pieces of content at a first position of a screen;
(b) a function of setting a clustering condition for the pieces of content in accordance with a user operation;
(c) a function of classifying the pieces of content into a cluster in accordance with the clustering condition; and
(d) a function of moving a display of the pieces of content from the first position toward a second position corresponding to the cluster.

(12) The program according to (11), wherein
the function (a) displays the pieces of content classified into a first cluster in accordance with a first clustering condition at the first position corresponding to the first cluster,
the function (b) sets a second clustering condition for the pieces of content in accordance with the user operation,
the function (c) classifies the pieces of content into a second cluster in accordance with the second clustering condition, and
the function (d) moves the display of the pieces of content from the first position toward a second position corresponding to the second cluster.

(13) The program according to (12), wherein
each of the pieces of content has positional information as an attribute,
the function (c) classifies the pieces of content into the cluster by classifying the positional information at a first granularity in accordance with the clustering condition, and
the first granularity differs between the first clustering condition and the second clustering condition.

(14) The program according to (12) or (13), wherein the function (b) sets the second clustering condition that differs between a first case in which the user operation is an operation in a first direction of the screen and a second case in which the user operation is an operation in a second direction of the screen, the second screen differing from the first direction.

(15) The program according to (14), wherein
each of the pieces of content has first and second positional information as attributes,
the function (c) classifies the pieces of content into the cluster by classifying the first positional information at a first granularity and classifying the second positional information at a second granularity in accordance with the clustering condition,
in the first case, the first granularity differs between the first clustering condition and the second clustering condition, and
in the second case, the second granularity differs between the first clustering condition and the second clustering condition.

(16) The program according to (15), wherein
the first positional information is represented by a position in the first direction on the screen, and the second positional information is represented by a position in the second direction on the screen.

(17) The program according to (16), wherein
the first positional information is information on time on a time axis,
the first granularity is a length that divides the time axis,
the second positional information is positional information in a geographical space, and
the second granularity is a hierarchical level of a predetermined address area used for dividing the geographical space.

(18) The program according to (12), wherein
each of the pieces of content has a plurality of attributes,
the function (c) classifies the pieces of content into the cluster using at least one attribute among the plurality of attributes in accordance with the clustering condition, and the at least one attribute differs between the first clustering condition and the second clustering condition.

(19) The program according to any one of (11) to (18), wherein the user operation includes a first or second movement operation in a first direction, the function (b) sets the clustering condition in accordance with the first movement operation, and the program further causes the computer to implement a function (e) of scrolling a display of the screen in the first direction in accordance with the second movement operation.

What is claimed is:

1. An information processing apparatus comprising:
a display;
a touch panel; and
at least one processor to:
control storing images and date information associated with the images,
control the display to display, in a day cluster condition, a first part of the stored images classified in a first day cluster of images at a first position on the display, the first day cluster of images corresponding to first day information of the date information associated with the images, and a second part of the stored images classified in a second day cluster of images at a second position on the display, the second day cluster of images corresponding to second day information of the date information associated with the images, wherein the first day information is different from the second day information and the second position is different from the first position,
control the display to display, in a month cluster condition, a third part of the stored images classified in a month cluster of images and corresponding to month information of the date information associated with the images, the third part of the stored images including the first part of the stored images and the second part of the stored images, and
control the display to display an animation on the display in which, in accordance with a detection of a first pinch operation on the touch panel, the first part of the stored images in the first day cluster of images are moved and grouped with the second part of the stored images in the second day cluster of images to form the month cluster of images on the display.

2. The information processing apparatus according to claim 1, wherein the at least one processor causes the apparatus to start the animation in response to the detection of the first pinch operation.

3. The information processing apparatus according to claim 1, wherein the first pinch operation is a pinch-out operation.

4. The information processing apparatus according to claim 1, wherein the at least one processor causes the apparatus to perform a display scrolling process in accordance with a second user operation different from the first pinch operation.

5. The information processing apparatus according to claim 1, wherein the at least one processor causes the apparatus to:
determine an opening amount of the first pinch operation, and
determine whether to change a state of clustering in accordance with the opening amount.

6. The information processing apparatus according to claim 1, wherein each of the images in the first day cluster of images, the second day cluster of images, and the month cluster of images displayed on the display is a thumbnail image.

7. The information processing apparatus according to claim 1, wherein the at least one processor causes the apparatus to:
detect a termination of the first pinch operation;
determine a change in distance between the objects during the first pinch operation; and
determine, based on the determined change in distance, whether to set the apparatus in a state in which the month cluster of images is to be displayed following the termination of the first pinch operation.

8. The information processing apparatus according to claim 1, wherein the at least one processor causes the apparatus to:
determine a change in distance between the objects during the first pinch operation; and
determine whether to change a state of clustering in accordance with the determined change in distance.

9. An information processing method comprising:
using at least one processor to
control storing images and date information associated with the images,
control a display to display, in a day cluster condition, a first part of the stored images classified in a first day cluster of images at a first position on the display, the first day cluster of images corresponding to first day information of the date information associated with the images, and a second part of the stored images classified in a second day cluster of images at a second position on the display, the second day cluster of images corresponding to second day information of the date information associated with the images, wherein the first day information is different from the second day information and the second position is different from the first position,
control the display to display, in a month cluster condition, a third part of the stored images classified in a month cluster of images and corresponding to month information of the date information associated with the images, the third part of the stored images including the first part of the stored images and the second part of the stored images, and
control the display to display an animation on the display in which, in accordance with a detection of a first pinch operation on a touch panel, the first part of the stored images in the first day cluster of images are moved and grouped with the second part of the stored images in the second day cluster of images to form the month cluster of images on the display.

10. The information processing method according to claim 9, wherein the operation of displaying the animation comprises starting the animation in response to the detection of the first pinch operation.

11. The information processing method according to claim 9, wherein the first pinch operation is a pinch-out operation.

12. The information processing method according to claim 9, further comprising using the at least one processor to control a display scrolling process in accordance with a second user operation different from the first pinch operation.

13. The information processing method according to claim 9, further comprising using the at least one processor to control:

determining an opening amount of the first pinch operation; and determining whether to change a state of clustering in accordance with the opening amount.

14. The information processing method according to claim 9, wherein each of the images in the first day cluster of images, the second day cluster of images, and the month cluster of images displayed on the display is a thumbnail image.

15. The information processing method according to claim 9, further comprising using the at least one processor to control:

detecting a termination of the first pinch operation;

determining a change in distance between the objects during the first pinch operation; and determining, based on the determined change in distance, whether to set a state in which the month cluster of images is to be displayed following the termination of the first pinch operation.

16. The information processing method according to claim 9, further comprising using the processor to control:

determining a change in distance between the objects during the first pinch operation; and determining whether to change a state of clustering in accordance with the determined change in distance.

17. A non-transitory computer-readable medium having stored thereon computer-readable instructions for performing an information processing method, the method comprising:

using at least one processor to control storing images and date information associated with the images, control a display to display, in a day cluster condition, a first part of the stored images classified in a first day cluster of images at a first position on the display, the first day cluster of images corresponding to first day information of the date information associated with the images, and a second part of the stored images classified in a second day cluster of images at a second position on the display, the second day cluster of images corresponding to second day information of the date information associated with the images, wherein the first day information is different from the second day information and the second position is different from the first position, control the display to display, in a month cluster condition, a third part of the stored images classified in a month cluster of images and corresponding to month information of the date information associated with the images, the third part of the stored images including the first part of the stored images and the second part of the stored images, and control the display to display an animation on the display in which, in accordance with a detection of a first pinch operation on a touch panel, the first part of the stored images in the first day cluster of images are moved and grouped with the second part of the stored images in the second day cluster of images to form the month cluster of images on the display.

18. The medium according to claim 17, wherein the operation of displaying the animation comprises starting the animation in response to the detection of the first pinch operation.

19. The medium according to claim 17, wherein the first pinch operation is a pinch-out operation.

20. The medium according to claim 17, wherein the method further comprises using the at least one processor to control a display scrolling process in accordance with a second user operation different from the first pinch operation.

* * * * *